US012641006B2

(12) United States Patent
Pandey et al.

(10) Patent No.: US 12,641,006 B2
(45) Date of Patent: May 26, 2026

(54) DYNAMIC EXPANSION AND CONTRACTION OF EDGE CLUSTERS FOR MANAGING ACCESS TO CLOUD-BASED APPLICATIONS

(71) Applicant: Palo Alto Networks, Inc., Santa Clara, CA (US)

(72) Inventors: Santosh Ghanshyam Pandey, Fremont, CA (US); Sidhesh Divekar, Milpitas, CA (US); Linus Aranha, Los Gatos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 705 days.

(21) Appl. No.: 17/315,167

(22) Filed: May 7, 2021

(65) Prior Publication Data

US 2022/0201673 A1 Jun. 23, 2022

Related U.S. Application Data

(63) Continuation-in-part of application No. 17/127,876, filed on Dec. 18, 2020.

(51) Int. Cl.
H04L 45/12 (2022.01)
H04L 43/0852 (2022.01)
(Continued)

(52) U.S. Cl.
CPC ........ H04L 45/124 (2013.01); H04L 43/0852 (2013.01); H04L 45/121 (2013.01);
(Continued)

(58) Field of Classification Search
CPC ... H04L 47/125; H04L 67/10; H04L 61/2514; H04L 45/124; H04L 45/121; H04L 45/126; H04L 45/74; H04L 43/0852; H04L 63/10
See application file for complete search history.

(56) References Cited

U.S. PATENT DOCUMENTS

| | | | |
|---|---|---|---|
| 7,904,541 B2 | 3/2011 | Swildens et al. | |
| 8,949,459 B1 * | 2/2015 | Scholl ..................... | H04L 45/04 709/239 |

(Continued)

OTHER PUBLICATIONS

Li et al., "Internet Anycast: Performance, Problems, & Potential", Aug. 25, 2018, SIGCOMM '18, Aug. 20-25, 2018, Budapest, Hungary, ACM ISBN 978-1-4503-5567-4/18/08, https://doi.org/10.1145/3230543.3230547, pp. 1-15. (Year: 2018).*
(Continued)

*Primary Examiner* — Gregory Todd
(74) *Attorney, Agent, or Firm* — GILLIAM IP PLLC

(57) ABSTRACT

Edge clusters execute in a plurality of regional clouds of a cloud computing platforms, which may include cloud POPs. Edge clusters may be programmed to control access to applications executing in the cloud computing platform. Edge clusters and an intelligent routing module route traffic to applications executing in the cloud computing platform. Cost and latency may be managed by the intelligent routing module by routing requests over the Internet or a cloud backbone network and using or bypassing cloud POPs. The placement of edge clusters may be selected according to measured or estimated latency. Latency may be estimated using speed test servers and the locations of speed test servers may be verified.

14 Claims, 14 Drawing Sheets

(51) Int. Cl.

| | |
|---|---|
| *H04L 45/121* | (2022.01) |
| *H04L 9/40* | (2022.01) |
| *H04L 45/74* | (2022.01) |

(52) U.S. Cl.
CPC ............ *H04L 45/126* (2013.01); *H04L 45/74* (2013.01); *H04L 63/10* (2013.01)

(56) References Cited

U.S. PATENT DOCUMENTS

| | | | |
|---|---|---|---|
| 9,391,856 | B2 | 7/2016 | Kazerani et al. |
| 10,218,781 | B2 | 2/2019 | Byers et al. |
| 10,887,276 | B1 | 1/2021 | Parulkar et al. |
| 11,070,453 | B2 | 7/2021 | Thiagarajan et al. |
| 11,095,534 | B1 | 8/2021 | Dunsmore et al. |
| 11,128,597 | B1 | 9/2021 | Johnson et al. |
| 11,394,636 | B1* | 7/2022 | Walker .................. H04L 47/125 |
| 2012/0124194 | A1 | 5/2012 | Shouraboura |
| 2015/0188823 | A1 | 7/2015 | Williams et al. |
| 2016/0119279 | A1 | 4/2016 | Maslak et al. |
| 2016/0191600 | A1 | 6/2016 | Scharber et al. |
| 2017/0310709 | A1 | 10/2017 | Foxhoven et al. |
| 2017/0317954 | A1 | 11/2017 | Masurekar et al. |
| 2020/0076685 | A1 | 3/2020 | Vaidya et al. |
| 2020/0099659 | A1 | 3/2020 | Cometto et al. |
| 2020/0162386 | A1* | 5/2020 | Radlein .............. H04L 41/0895 |
| 2021/0075729 | A1* | 3/2021 | Fedorov .............. H04L 41/5067 |
| 2021/0314291 | A1 | 10/2021 | Chandrashekhar et al. |
| 2021/0328893 | A1 | 10/2021 | Cherkas et al. |
| 2022/0060431 | A1* | 2/2022 | Vadayadiyil Raveendran ............ H04L 41/12 |
| 2022/0200957 | A1 | 6/2022 | Prabagaran et al. |
| 2022/0377131 | A1 | 11/2022 | Szilagyi et al. |
| 2024/0380654 | A1 | 11/2024 | Zaicenko et al. |

OTHER PUBLICATIONS

Yu et al., A Survey on the Edge Computing for the Internet of Things, Nov. 29, 2017, Digital Object Identifier 10.1109/ACCESS. 2017.2778504, vol. 6, 2018, pp. 6900-6919. (Year: 2017).*

U.S. Appl. No. 17/127,876, Notice of Allowance mailed Oct. 15, 2025, 6 pages.

U.S. Appl. No. 17/127,876, Non-Final Office Action, mailed Nov. 3, 2022, 16 pages.

U.S. Appl. No. 17/315,175, Non-Final Office Action, mailed Dec. 22, 2022, 25 pages.

U.S. Appl. No. 17/315,192, Non-Final Office Action, mailed Dec. 21, 2022, 13 pages.

U.S. Appl. No. 18/530,458, Non-Final Office Action mailed Jul. 15, 2025, 10 Pages.

U.S. Appl. No. 17/127,876 Final Office Action, mailed May 8, 2023, 16 pages.

* cited by examiner

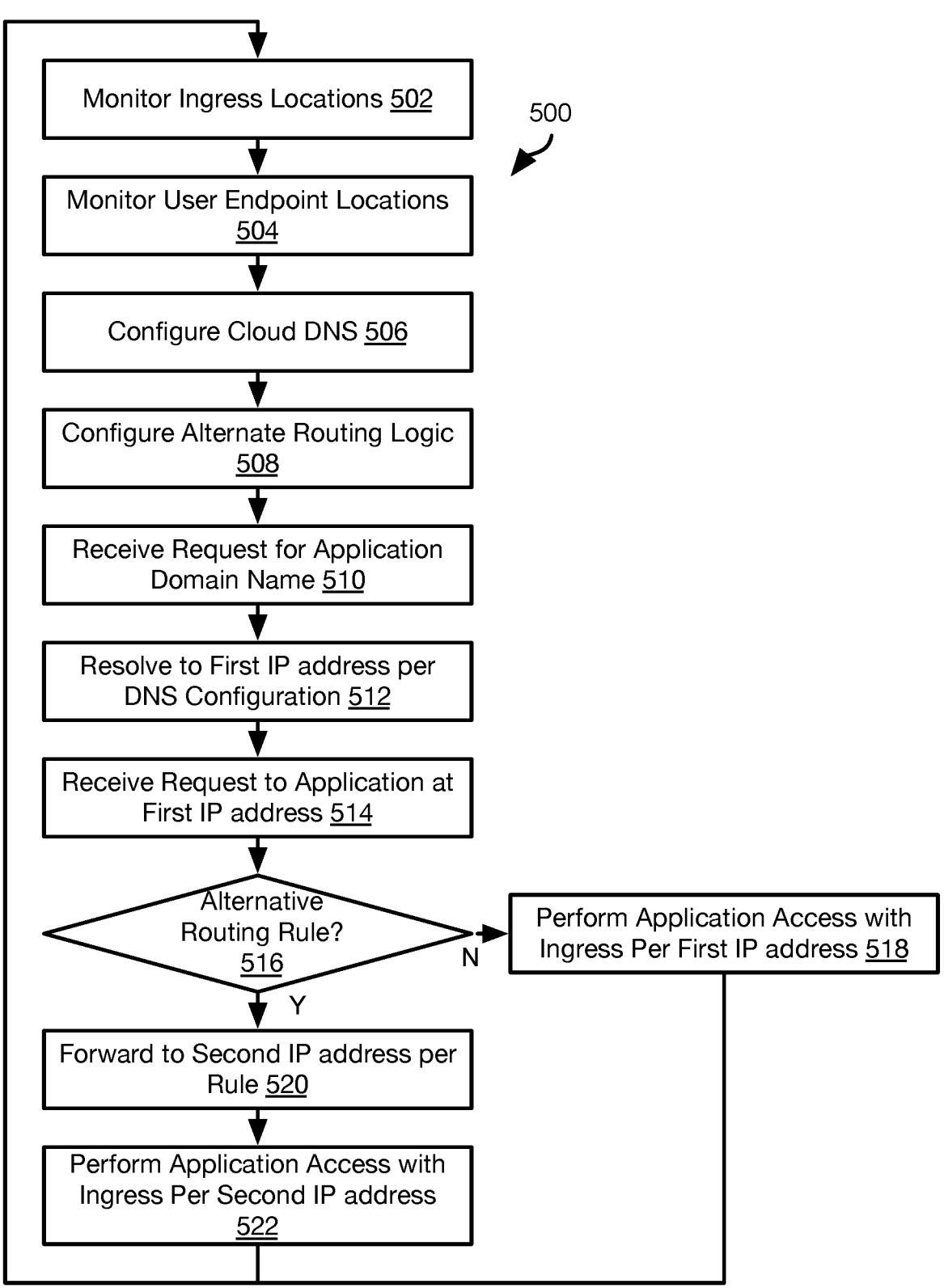

Monitor Ingress Locations 502

500

Monitor User Endpoint Locations 504

Configure Cloud DNS 506

Configure Alternate Routing Logic 508

Receive Request for Application Domain Name 510

Resolve to First IP address per DNS Configuration 512

Receive Request to Application at First IP address 514

Alternative Routing Rule? 516

N → Perform Application Access with Ingress Per First IP address 518

Y

Forward to Second IP address per Rule 520

Perform Application Access with Ingress Per Second IP address 522

Fig. 5

Three-Lanes

| Cost Effective Lane | No Cloud POP | No Cloud Backbone |
|---|---|---|
| Fast Lane: | Cloud POP | Cloud Backbone |
| Performance Lane | No Cloud POP | Cloud Backbone |

Monitor Application Access Locations
802

Monitor Data Read/Write Patterns 804

Characterize Application Cachability
806

Above First
Threshold?
808

Configure DNS to Route Access to
Plurality of Edge Clusters Caching for
App 810

Above
Second
Threshold?
812

Configure DNS to Route Access to
Reduced Set of Edge Clusters 814

Configure Geo DNS to Reference
Individual Edge Cluster 816

800

1200

Sample L2 Latency Data Using Cloud Census Agents 1202

Identify Adjacent Secondary Cloud Region 1204

Determine Inter-Cloud Latency 1206

Generate Local Model (Slope and Intercept) 1208

Estimate L1 Latency 1210

Sample Actual L1 Latency 1212

Update Model 1214

DYNAMIC EXPANSION AND CONTRACTION OF EDGE CLUSTERS FOR MANAGING ACCESS TO CLOUD-BASED APPLICATIONS

RELATED APPLICATION

This application a continuation-in-part of U.S. application Ser. No. 17/127,876, entitled "Managing Application Access Controls And Routing In Cloud Computing Platforms", filed Dec. 18, 2020, the disclosure of which is incorporated by reference herein in its entirety.

FIELD OF THE INVENTION

The present invention relates generally to systems and methods for implementing enterprise security with respect to applications hosted on a cloud computing platform.

BACKGROUND OF THE INVENTION

Currently there is a trend to relocate applications, databases, and network services to cloud computing platforms. Cloud computing platforms relieve the user of the burden of acquiring, setting up, and managing hardware. Cloud computing platforms may provide access across the world, enabling an enterprise to operate throughout the world without needing a physical footprint at any particular location.

However, implementing a security perimeter for a cloud computing platform becomes a much more complex problem than when hosting on premise equipment. For example, an enterprise may host applications on multiple cloud computing platforms that must all be managed. Authenticating users of applications according to a coherent policy in such diverse environment is difficult using current approaches. These problems are further complicated when users of the applications of an enterprise are accessing the applications from diverse locations across the globe.

It would be an advancement in the art to implement an improved solution for managing access to applications hosted in a cloud computing platform.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a process flow diagram of a method for performing domain name resolution in a cloud computing platform in accordance with an embodiment of the present invention;

DETAILED DESCRIPTION

Figure 1:
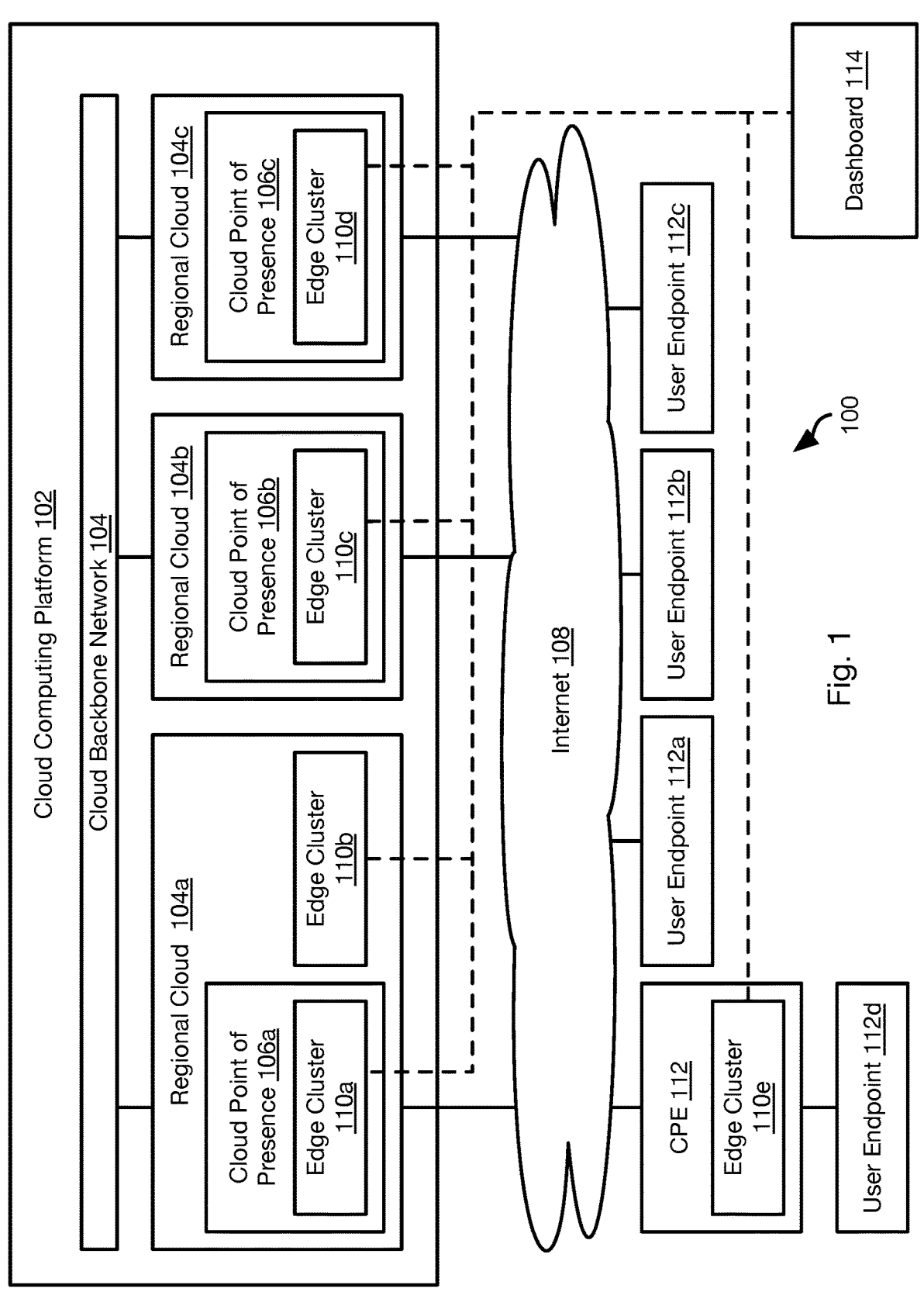
FIG. 1 is a schematic block diagram of a network environment for managing access to cloud-based applications in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Referring to FIG. 1, a network environment may include one or more cloud computing platforms 102, such as AMAZON WEB SERVICES (AWS), MICROSOFT AZURE, GOOGLE CLOUD PLATFORM, or the like. As will be discussed below, multiple cloud computing platforms 102 from multiple providers may be used simultaneously. As known in the art, a cloud computing platform 102 may be embodied as a set of computing devices coupled to networking hardware and providing virtualized computing and storage resources such that a user may instantiate and execute applications, implement virtual networks, and allocate and access storage without awareness of the underlying computing devices and network hardware. Each cloud computing platform 102 may implement some or all aspects of the cloud computing model described above. One or more of the cloud computing platforms 102 may be a public cloud providing cloud computing services to multiple entities for a fee. One or more of the cloud computing platforms 102 may also be a private cloud computing platform built and maintained on a premise of the entity utilizing the private cloud computing platform 102. In some implementations, systems and methods described herein may be implemented by a combination of one or more public private cloud computing platforms 102 and one or more private cloud computing platforms 102.

A cloud computing platform 102 from the same provider may be divided into different regional clouds, each regional cloud including a set of computing devices in or associated with a geographic region and connected by a regional network. These regional clouds may be connected to one another by a cloud backbone network 104. The cloud backbone network 104 may provide high throughput and low latency network connections for traffic among a plurality of regional clouds 104a-104c. The cloud backbone network 104 may include routers, switches, servers and/or other networking components connected by high capacity fiber optic networks, such as transoceanic fiber optic cables, the Internet backbone, or other high-speed network. Each regional cloud 104a-104c may include cloud computing devices and networking hardware located in and/or processing traffic from a particular geographic region, such as a country, state, continent, or other arbitrarily defined geographic region.

A regional cloud 104a-104c may include one or more points of presence (POPs) 106a-106c. For example, each regional cloud 104a-104c may include at least one POP 106a-106c. A cloud POP 106a-106c may be a physical location hosting physical network hardware that implements an interface with an external network, such as a wide area network (WAN) that is external to the cloud computing platform 102. The WAN may, for example, be the Internet 108. A WAN may further include a 5G Cellular Network and/or a LONG TERM EVOLUTION (LTE) cellular network.

For example, a high-speed, high-capacity network connection of an Internet service provider (ISP) may connect to the POP 106a-106c. For example, the network connection may be a T1 line, leased line, fiber optic cable, Fat Pipe, or other type of network connection. The POP 106a-106c may have a large amount of servers and networking equipment physically at the POP 106a-106c enabled to handle network traffic to and from the network connection and possibly providing computing and storage at the POP 106a-106c.

The POP 106a-106c therefore enables users to communicate with the cloud computing platform 102 very efficiently and with low latency. A cloud computing platform 102 may implement other entrance points from the Internet 108 in a particular regional cloud 104a-104c. However, a POP 106a-106c may be characterized as providing particularly low latency as compared to other entrance points.

Edge clusters 110a-110c may execute throughout a cloud computing platform 102. Edge clusters 110a-110c may operate as a cooperative fabric for providing authenticated access to applications and performing other functions as described herein below. Edge clusters 110*a*, 110*c*, 110*d* may be advantageously hosted at a cloud POP 106*a*-106*c*. Edge clusters 110*b* may also be implemented at another location within a cloud computing platform 102 other than a cloud POP 106*a*-106*c*. In some instances, one or more edge cluster 108*e* may also execute on customer premise equipment (CPE) 112. One or more edge cluster 108*e* on CPE 112 may be part of a fabric including one or more edge clusters 110*a*-110*d* executing in a cloud computing platform 102. Edge clusters 110*a*-110*d* on cloud computing platforms 102 of different providers may also form a single fabric functioning according to the functions described herein below.

Each edge cluster 110*a*-110*e* may be implemented as a cluster of cooperating instances of an application. For example, each edge cluster 110*a*-110*e* may be implemented as a KUBERNETES cluster managed by a KUBERNETES master, such that the cluster includes one or more pods, each pod managing one or more containers each executing an application instance implementing an edge cluster 110*a*-110*e* as described herein below. As known in the art, a KUBERNETES platform provides a platform for instantiating, recovering, load balancing, scaling up, and scaling down, an application including multiple application instances. Accordingly, the functions of an edge cluster 110*a*-110*c* as described herein may be implemented by multiple application instances with management and scaling up and scaling down of the number of application instances being managed by a KUBERNETES master or other orchestration platform.

Users of a fabric implemented for an enterprise may connect to the edge clusters 110*a*-110*e* from endpoints 112*a*-112*d*, each endpoint being any of a smartphone, tablet computer, laptop computer, desktop computer, or other computing device. Endpoints 112*a*-112*d* may connect to the edge clusters 110*a*-110*e* by way of the Internet or a local area network (LAN) in the case of an edge cluster hosted on CPE 112.

Coordination of the functions of the edge clusters 110*a*-110*e* to operate as a fabric may be managed by a dashboard 114. The dashboard 114 may provide an interface for configuring the edge clusters 110*a*-110*e* and monitoring functioning of the edge clusters 110*a*-110*e*. Edge clusters 110*a*-110*e* may also communicate directly to one another in order to exchange configuration information and to route traffic through the fabric implemented by the edge clusters 110*a*-110*e*.

In the following description, the following conventions may be understood: reference to a specific entity (POP 106*a*, edge cluster 110*a*, endpoint 112*a*) shall be understood to be applicable to any other instances of that entity (POPs 106*b*-106*c*, edge clusters 110*b*-110*e*, endpoints 112*b*-112*d*). Likewise, examples referring to interaction between an entity and another entity (e.g., an edge cluster 110*a* and an endpoint 112*a*, an edge cluster 110*a* and another edge cluster 110*b*, etc.) shall be understood to be applicable to any other pair of entities having the same type or types. Unless specifically ascribed to an edge cluster 110*a*-110*e* or other entity, the entity implementing the systems and methods described herein shall be understood to be the dashboard 114 and the computing device or cloud computing platform 102 hosting the dashboard 114.

Although a single cloud computing platform 102 is shown, there may be multiple cloud computing platforms 102, each with a cloud backbone network 104 and one or more regional clouds 104*a*-104*c*. Edge clusters 110*a*-110*e* may be instantiated across these multiple cloud computing platforms and communicate with one another to perform cross-platform routing of access requests and implementation of a unified security policy across multiple cloud computing platforms 102.

Where multiple cloud computing platforms 102 are used, a multi-cloud backbone 104 may be understood to be defined as routing across the cloud backbone networks 104 of multiple cloud computing platforms 102 with hops between cloud computing platforms being performed over the Internet 108 or other WAN that is not part of the cloud computing platforms 102. Hops may be made short, e.g., no more than 50 km, in order to reduce latency. As used herein, reference to routing traffic over a cloud backbone network 104 may be understood to be implementable in the same manner over a multi-cloud backbone as described above.

Figure 2:
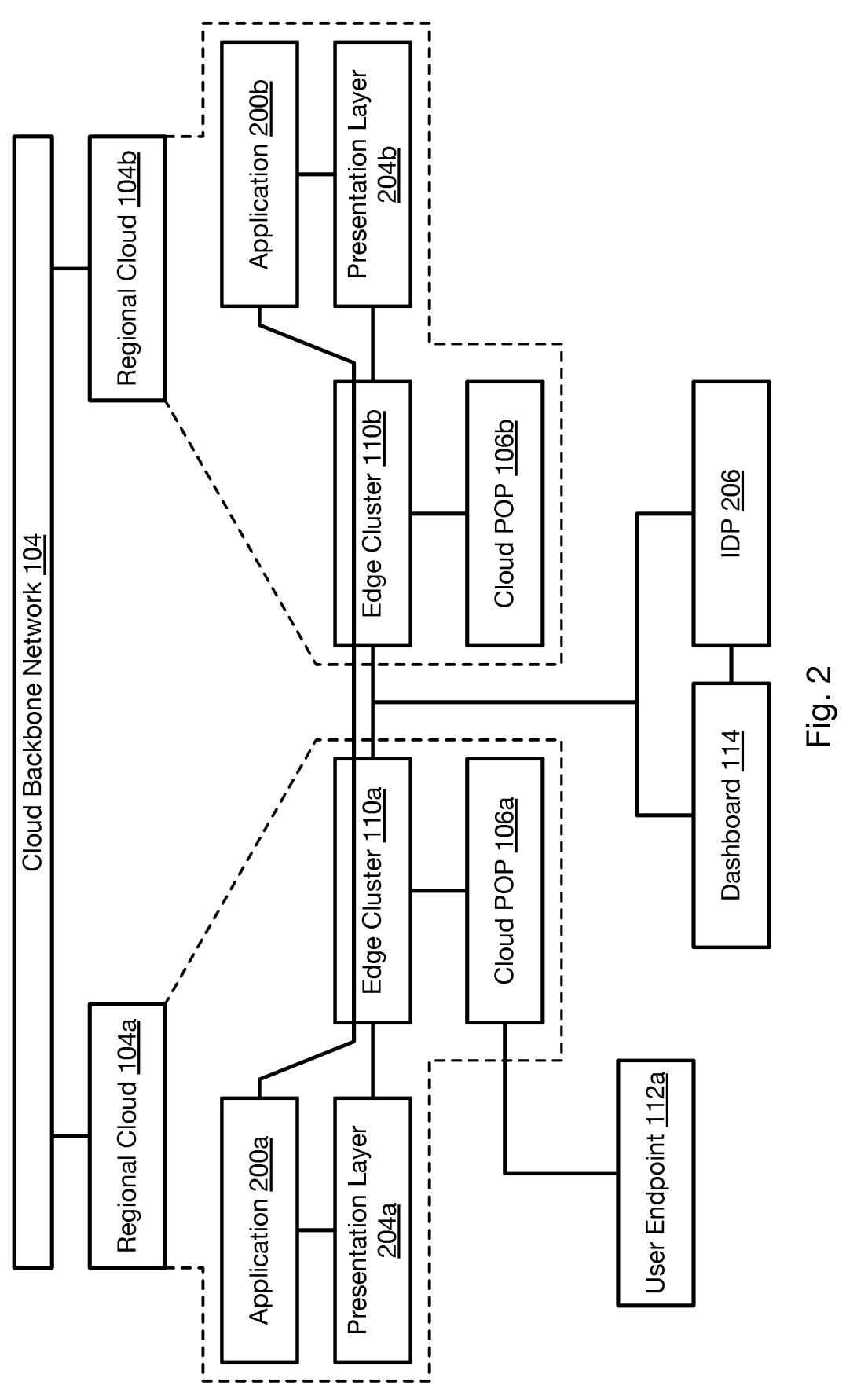
FIG. 2 is a schematic block diagram of components for managing access to cloud-based applications in accordance with an embodiment of the present invention.

FIG. 2 illustrates an example approach for managing application instances 200*a*-200*b* of an enterprise that are managed by a fabric implemented by a fabric including edge clusters 110*a*, 110*b*. Each edge cluster 110*a*, 110*b* may be in a different regional cloud 104*a*, 104*b* of a cloud computing platform 102, each regional cloud 104*a*, 104*b* being connected to the cloud backbone network 104 of that cloud computing platform 102. In the illustrated example, each edge cluster 110*a*, 110*b* executes within a cloud POP 106*a*, 106*b* of each regional cloud 104*a*, 104*b*, respectively. In other implementations, one or both of the edge clusters 110*a*, 110*b* is not executing within the cloud POP 106*a*, 106*b* of the regional cloud 104*a*, 104*b* by which it is executed.

Each application instance 200*a*, 200*b* may have a corresponding presentation layer 204*a*, 204*b*. The presentation layer 204*a*, 204*b* may, for example, be a web interface by which an interface to the application instance 200*a*, 200*b* is generated and transmitted to a user endpoint 112*a* and by which interactions received from the user endpoint 112*a* are received and processed by the application instance 200*a*, 200*b*. The presentation layer 204*a*, 204*b* may also be a graphical user interface (GUI) native to a computing platform simulated by the cloud computing platform 102, the GUI being transmitted to the endpoint 112*a* and interactions with the GUI being received from the user endpoint 112*a* and submitted to the application instance 200*a*, 200*b* by the GUI. In yet another alternative, the presentation layer 204*a*, 204*b* is a module programmed to communicate with a client executing on the user endpoint 112*a* in order to transmit information to the endpoint 112*a* and receive user interactions from the user endpoint 112*a*.

The edge clusters 110*a*, 110*b* may act as a gateway to the presentation layers 204*a*, 204*b* and provide access to the presentation layers 204*a*, 204*b* only to authenticated users. An example approach implemented by the edge clusters 110*a*, 110*b* is described below with respect to FIG. 3. The edge clusters 110*a*, 110*b* may be configured by the dashboard 114. The dashboard 114 may incorporate or cooperate with an identity provider (IDP) 206 such as OKTA, ONELOGIN, CENTRIFY, EMPOWERID, OPTIMAL IDM, BITIUM, LAST PASS, and PINGIDENTITY. Alternatively, the IDP 206 may be a cloud provider or a vendor providing virtual machines (e.g., VMWARE) within which the edge clusters 110*a*, 110*b* and application instances 200*a*, 200*b* are executing.

As shown in FIG. 2, application instances 200*a*, 200*b* may communicate with one another as part of their functionality. In some instances, this communication may be routed by way of the edge clusters 110*a*, 110*b* of the fabric managing the application instances 200*a*, 200*b*.

Figure 3:
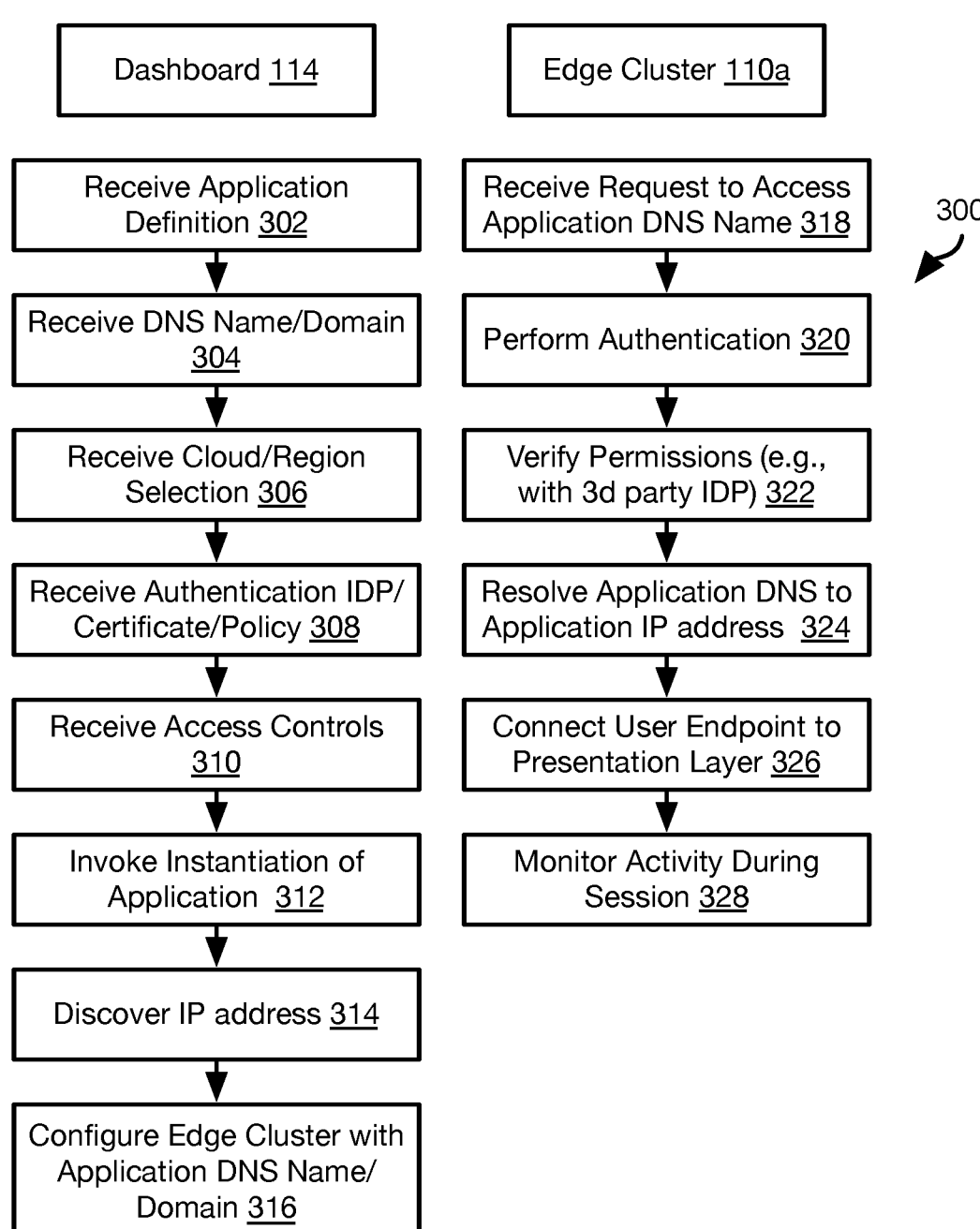
FIG. 3 is a process flow diagram of a method for performing managing access to an application using domain name resolution in accordance with an embodiment of the present invention.

Referring to FIG. 3, the instances of an application 200*a*, 200*b* (hereinafter only application instance 200*a* is discussed) may be instantiated and access thereto controlled using the illustrated method 300.

The method 300 may include receiving 302, such as by the dashboard 114, an application definition. The application definition may be received from an administrator, a script, or from another source. The application definition may specify an executable of which the application instance 200a will be an instance, configuration parameters for an instance of the executable, or other configuration information. The dashboard 114 may further receive 304 one or both of a name and a domain in a like manner. The name and/or domain may be according to a DNS (domain name service). As discussed in greater detail below, the dashboard 114 and edge clusters 110a-110e may implement DNS internal to the fabric managed by the edge clusters 110a-110e. Accordingly, the DNS may manage mapping of names and domains to actual addresses, e.g. IP addresses, of application instances in one or more cloud computing platforms 102 and one or more regional clouds 104a, 104b of one or more cloud computing platforms 102.

The method 300 may include receiving 306 selection of a cloud computing platform 102 and possibly selection of a particular regional cloud 104a, 104b, e.g. California, USA regional cloud for the AWS cloud computing platform 102. The selection of step 306 may be received from an administrator, read from a configuration script, or received from another source. In some implementations, this step is omitted and the dashboard 114 automatically selects a cloud computing platform 102 and possibly a regional cloud 104a, 104b. In yet another alternative, only a cloud computing platform 102 is selected and the cloud computing platform 102 automatically selects a regional cloud 104a, 104b.

The method 300 may include receiving 308 a definition of some or all of an IDP 206 to use for controlling access to the application instance 200a, an authentication certificate associated with the application instance 200a for use in authenticating users with the application instance 200a, and an authentication policy governing access to the application instance 200a (e.g., user accounts, groups, or the like that may access the application instance 200a). The information of step 308 may be received from an administrator, read from a configuration script, or received from another source.

The method 300 may include receiving 310 access controls. The access controls may be received from an administrator, read from a configuration script, or received from another source. The access controls may include some or all of time-based limitations (times of day, days of the week, etc. during which the application instance 200a may be accessed), location-based limitations (locations from which endpoints 110a-110d may access the application instance), a requirement for two-factor authentication, etc., or other type of access control.

The method 300 may further include invoking 312 instantiating an instance of the executable specified at step 302 as the application instance 200a in the cloud computing platform 102, and possibly regional cloud, specified at step 306. For example, the cloud computing platform 102 may provide an interface for instantiating application instances on virtualized computing resources. Accordingly, step 312 may include invoking this functionality to cause the cloud computing platform 102 or other tool to instantiate an application instance 200a. In some embodiments, the application instance 200a already exists such that step 312 is omitted and one or more edge clusters 110a-110e are configured to manage access to the application instance 200a.

The method 300 may include discovering 314 an internet protocol (IP) address of the application instance 200a. For example, in response to an instruction to create the application instance 200a, the cloud computing platform 102 may create the application instance 200a and assign an IP address to the application instance 200a. The cloud computing platform 102 may then return the IP address to the entity that requested instantiation, which may be the dashboard 114 in the illustrated example.

The method 300 may further include the dashboard 114 configuring 316 one or more edge clusters 110a-110e of the fabric to manage access to the application instance 200a. This may include storing a link between the name and/or domain from step 304 with the IP address from step 314 by the DNS. In some embodiments, the name and/or domain from step 304 may be distributed to endpoints 110a-110e whereas the IP address is not. Accordingly, the edge clusters 110a-110e may function as DNS servers and further control access to the application instance 200a by refraining from forwarding traffic to the IP address until a source of the traffic has been properly authenticated.

Step 316 may further include configuring one or more edge clusters 110a-110e of the fabric according to the authentication requirements of step 308 and the access controls of step 310. For example, one or more edge clusters 110a-110e may be programmed to condition allowance of a request to access the application instance 200a on some or all of (a) receiving confirmation from the specified IDP 206 that a source of the request is authenticated, (b) verifying a certificate submitted with the request according to a certificate received at step 308, (c) verifying that the request was received according to the access controls of step 310 (from a permitted location, at a permitted time, etc.).

An edge cluster 110a configured as described above with respect to step 316 may receive 318 a request to access the application instance 200a from an endpoint 112a, the request including the name and/or domain of the application instance 200a.

The edge cluster 110a may perform 320 authentication of the request and/or the endpoint 112a. This may include instructing the endpoint 112a to authenticate with the IDP 206 and receiving verification from the IDP 206 that the endpoint 112a is authenticated, such as authenticated for a particular user identifier. Step 320 may include authentication by another approach such as verification of a user identifier and password, verification of a certificate, or other authentication means.

If authentication is not successful at step 320, the remainder of the steps of the method 300 may be omitted and the request may be ignored, recorded, flagged as potentially malicious, or subject to other remedial action.

In response to successful authentication at step 320, the edge cluster 110a may resolve the name and/or domain of the request to the IP address mapped to it at step 316 and connect 326 the user endpoint 112a to the application instance. Connection may include establishing a network connection to the application instance 200a. The edge cluster 200a may implement network address translation (NAT) such that the IP address is not disclosed to the user endpoint 112a. Accordingly, a different IP address, such as the address of the edge cluster 200a, may be used as the destination of traffic sent by the user endpoint 112a and the edge cluster 200a may route the traffic to the IP address of the application instance 200a using NAT 200a and forward the traffic to the application instance 200a.

In some embodiments, the edge cluster 110a may monitor activities of the user endpoint 112a with respect to the application instance 200a and block further access in response to suspicious activity. Examples of suspicious activity may include access patterns that are different from past access by the endpoint 112*a*: access from a different country, a different time of day, an unusually high volume of traffic, or the like. The edge cluster 110*a* may therefore compile information of typical access patterns for the edge cluster 110*a* in order to detect anomalous access patterns.

Figure 4:
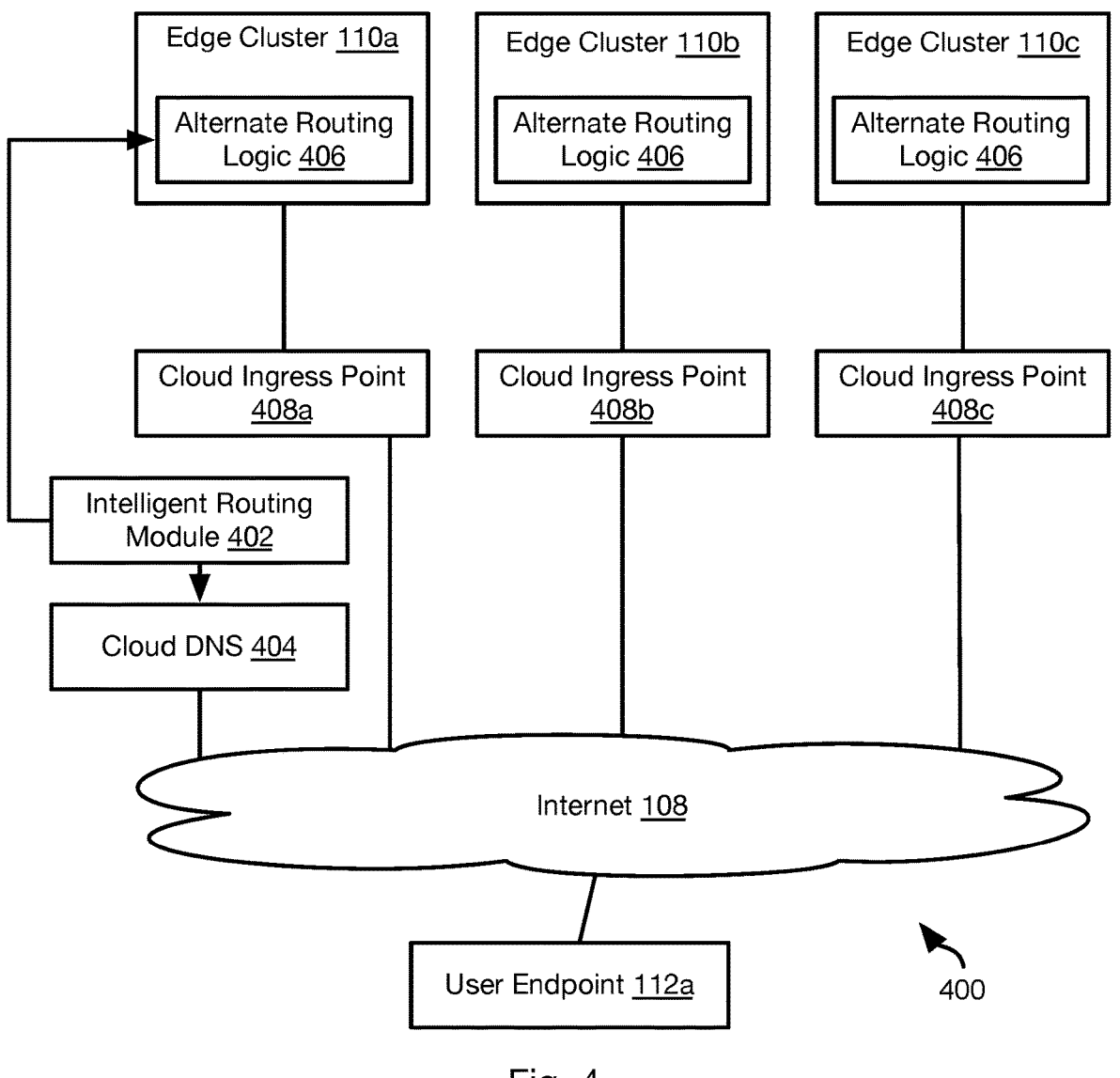
FIG. 4 is a schematic block diagram of components for performing domain name resolution in a cloud computing platform in accordance with an embodiment of the present invention.

FIG. 4 illustrates a system 400 that may be implemented by a fabric of edge clusters 110*a*-110*c* in a network environment, such as the network environment 100. In the illustrated system, an intelligent routing module 402 programs cloud DNS 404 of a cloud computing platform 102. The intelligent routing module 402 may be a component within the dashboard 114 or managed in response to user instructions input to the dashboard 114. The cloud DNS 404 may control the routing of traffic received from the user endpoint 112*a* among various ingress points 408*a*-408*c* of the cloud computing platform 102. The ingress points 408*a*-408*c* may include ingress points to different regional clouds and/or different ingress points to the same regional cloud.

A user endpoint 112*a* may transmit a request to a cloud computing platform 102 over the Internet 108. The request may be a request to access a resource name, such as in the form of a URL including a domain name and possibly one or more other items of information, such as a sub-domain, computer name, and possibly one or more other items of identifying information of a requested resource. The resource name may reference an application instance 200*a* and may include a name and domain configured for the application instance 200*a* as described above with respect to step 304 of the method 300.

The cloud DNS 404 may receive the request and resolve the resource name to an address, such as an IP address, assigned to one or more of the edge clusters 110*a*-110*c* implementing a fabric. The resolution by the cloud DNS 404 may be according to programming of the cloud DNS 404 by the intelligent routing module 402. Accordingly, a resource name may be associated by the intelligent routing module 402 to any edge cluster 110*a*-110*e* of a fabric. The cloud DNS 404 may implement Anycast DNS whereby the routing of a request is conditioned on a location of the user endpoint 112*a* that issued the request.

In some implementations, an edge cluster 110*a*-110*c* of a fabric may implement alternative routing logic 406. A request received by an edge cluster 110*a* may be evaluated according to the alternative routing logic 406, which may instruct the edge cluster 110*a* to instruct the endpoint 112*a* that generated the request to resubmit the request to a different edge cluster 110*b*. For example, the alternative routing logic 406 may transmit alternative service ("Alt-Svc") messages according to hypertext transport protocol (HTTP). In some implementations, the cloud DNS 404 may be incapable of fine-grained routing of requests. For example, there may be edge clusters 110*a*-110*c* at various geographic locations in a regional cloud whereas the cloud DNS 404 only enables a user to perform geographic name resolution to a single address within each regional cloud. Accordingly, the intelligent routing module 402 may program the cloud DNS 404 to route requests to an edge cluster 110*a* in a regional cloud. The intelligent routing module 402 may further configure the alternate routing logic 406 of that edge cluster 110*a* to evaluate the location of user endpoints 112*a* and route requests from that user endpoint 112*a* to another edge cluster 110*b* in that regional cloud. For example, edge cluster 110*b* may be closer to the user endpoint 112*a* then the edge cluster 110*a*.

The system 400 may be used to perform arbitrary routing of traffic between a user endpoint 112*a* and any of the edge clusters 110*a*-110*c*. Various applications of the system 400 are described herein below.

For example, an edge cluster 110*a*-110*e* may be associated with the name and/or domain assigned to the application instance 200*a* in the cloud DNS 404 and/or alternative routing logic 406 such that requests addressed to the name and/or domain of the application instance 200*a* will be routed according to the static IP address or Anycast IP address associated with the edge cluster 110*a*-110*e* for the application instance 200*a*. In another example, a request to resolve the name and/or domain of an application instance 200*a* may be resolved by the cloud DNS 404 and or alternative routing logic 406 to an IP address that may be a static IP address of a particular edge cluster 110*a*-110*e* or an Anycast IP address that could be resolved to one of multiple edge clusters 110*a*-110*e*.

The source of the resolution request may then transmit a request to the IP address returned to it, with the request being routed according to functionality associated with that IP address (static routing or Anycast routing).

FIG. 5 illustrates a method 500 of performing routing using the system 400. The method 500 may be performed by the intelligent routing module 402 and/or dashboard 114.

The method 500 may include monitoring 502 ingress locations. This may include tracking ingress locations 408*a*-408*c* of a cloud computing platform 102 at which requests from user endpoints 112*a*-112*d* are received. Monitoring 502 may include compiling statistics such as a frequency of requests for a given ingress points 408*a*-408*c* (requests per hour, minute, or other time interval) over time. The ingress point 408*a*-408*c* of requests may be detected due to reporting by the cloud computing platform 102, by the edge cluster 110*a*-110*d* that received a request recording an ingress point 408*a*-408*c* through which the request was received, or by some other means.

The method 500 may further include monitoring 504 the locations of user endpoints 112*a*-112*d* from which requests were received. The location of an endpoint 112*a*-112*d* at a time of generation of a request may be obtained by: inferring a location from a source IP address of the request, reading the location from a header included in the request, reading the location from an explicitly provided location value provided by the endpoint 112*a*-112*d* within the request. Monitoring 504 the locations may include some or all of compiling statistics for each location represented in received requests at varying degrees of specificity: requests from a country, from each state or province within the country, from each metropolitan area within the country, within each city within the country, etc. Statistics may be in the form of a frequency of requests (requests per day, hour, minute, or other time window) over time.

The method 500 may include configuring 506 the cloud DNS 404 and/or configuring 508 alternate routing logic 406 according to the data obtained from the monitoring steps 502, 504. Example approaches for configuring routing of requests for a fabric of edge cluster 110*a*-110*e* according to usage data are described below with respect to FIGS. 6 through 10B.

The method 500 may include receiving 510 an original request from user endpoint 110*a* to resolve a name and/or domain of the application instance 200*a*. The original request may be a domain resolution request or a request to access the application instance 200*a* including the name and/or domain. The original request may be received by the cloud DNS 404. In response to the programming of step 506, the cloud DNS 404 resolves 512 the name and/or domain to an IP address of an edge cluster, e.g., edge cluster 110*a*. The user endpoint 110*a* may receive this IP address from the cloud DNS 404 and transmit a second request to access the application instance 200*a* to the IP address of the edge cluster 110*a*. Alternatively, the cloud DNS 404 may forward the original request to the IP address.

Resolving 512 the domain name to an IP address may include using any of the approaches described above with respect to FIG. 4. These may include resolving the IP address to an Anycast IP address, resolving the IP address using geographic domain name service (GeoDNS) to a static or Anycast IP address, or resolving of the IP address to an Anycast IP address or static IP address followed by using alternative routing logic to redirect a request to an alternative edge cluster 110*a*-110*e*.

The edge cluster 110*a* receives 514 the request to access the application instance 200*a* (the original request forwarded by cloud DNS 404 or the second request from the user endpoint 112*a*). The edge cluster 110*a* may evaluated 516 whether there is alternative routing logic 406 applicable to the request. For example, the alternative routing logic may map a routing rule to one or both of the application instance 200*a* and one or more locations of user end points. Accordingly, step 516 may include determining whether the location of the user endpoint 112*a* and/or application instance 200*a* are referenced by a routing rule and if not, facilitates application access through the edge cluster 110*a*. This may include routing traffic through an ingress point 408*a*-408*c* of the cloud computing platform associated with the edge cluster 110*a*, e.g. an ingress point 408*a*-408*c* determined according to programming of the cloud DNS 404. If so, the method 500 may include the edge cluster 110*a* forwarding 520 the request to a second IP address, e.g. the IP address of a second edge cluster 110*b* having a different ingress location to the cloud computing platform in the same or different regional cloud. Redirecting may include one or both of the edge cluster 110*a* forwarding the request to the second edge cluster 110*b* and the edge cluster 110*a* transmitting the second IP address of the second edge cluster 110*b* to the user endpoint 112*a* with an instruction to access the application instance 200*a* at the second IP address. The user endpoint 112*a* may thereafter perform 522 application access (e.g., send access requests to and receive responses from the application instance 200*a*) through an ingress 408*a*-408*c* corresponding to the second IP address, such has an ingress location 408*a*-408*c* that is physically closest to a computing device executing the second edge cluster 112*b*. Selection of the ingress location 408*a*-408*c* for a given IP address may be performed by the cloud DNS 404 or by other routing logic. For example, traffic addressed to the IP address may be routed by the Internet 108 to the ingress location 408*a*-408*c* according to DNS information provided to routing devices of the Internet 108 by the cloud computing platform 102.

Figures 6, 7:
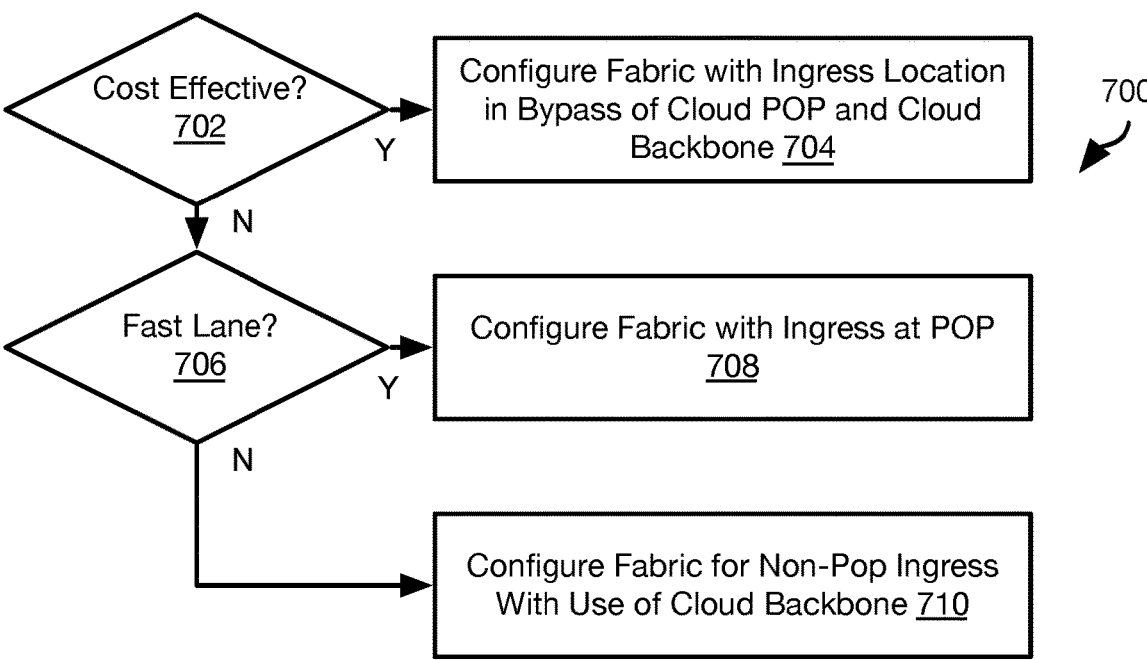
FIG. 6 is a table illustrating different routing options with respect to a cloud computing platform in accordance with an embodiment of the present invention.
FIG. 7 is a process flow diagram of a method for implementing different routing options with respect to a cloud computing platform in accordance with an embodiment of the present invention.

Referring to FIGS. 6 and 7, routing of requests, such as using the DNS system 400, may be performed to take into the account latency and cost. Referring specifically to FIG. 6, routing options may be grouped into "lanes," including a cost effective lane, fast lane, and performance lane. The cost effective lane avoids ingress locations at cloud POPs 106*a*-106*c* and routing of traffic over the cloud backbone 104 inasmuch as there may be additional charges for such usage. The cost effective lane may reduce at the expense of higher latency. The fast lane may include an ingress location at a cloud POP 106*a*-106*c* (e.g., the cloud POP 106*a*-106*c* closest to the user endpoint 112*a* generating a request) with intra-cloud traffic being routed over the cloud backbone 104.

The fast lane may provide reduced latency at increased cost from utilization of the POPs 106*a*-106*c* and cloud backbone 104. The performance lane may provide an intermediate level of latency and cost by using an ingress location other than a cloud POP 106*a*-106*c* while still routing intra cloud traffic over the cloud backbone 104.

The lane used may be a user-configurable parameter. For example, a particular application instance 200*a* may be assigned to a lane such that the intelligent routing module 402 will program the cloud DNS 404 and/or alternative routing logic 406 to route requests to that application instance 200*a* according to that lane. Application instances may be assigned to lanes individually, as a group (e.g., all instances of the same executable). Lanes may be additionally or alternatively be assigned to users or groups of users. For example, all requests from a user or group may be routed according to a particular lane or a combination. In another example, a particular combination of user and application instance may be assigned to a particular lane.

Referring to FIG. 7, the illustrated method 700 may be used by the intelligent routing module 402 to implement the three lanes, or other number of lanes. If the lane for a user and/or application instance is found 702 to be the cost effective lane, the intelligent routing module 402 configures 704 the fabric to bypass cloud POPs 106*a*-106*c* and the cloud backbone 104. For example, for an application instance 200*a* in a first regional cloud, requests to access the application instance 200*a* may be routed over the Internet 108 to an ingress point that is not a POP 106*a*-106*c*, including requests that are closer to a second regional cloud than to the first regional cloud. This configuration may include assigning an edge cluster 110*a* in the first regional cloud a static IP address that is not an Anycast IP address. In this manner, traffic addressed to the application instance will be routed to the static IP address over the Internet 108 rather than through a cloud POP 106*a*-106*c* or the cloud backbone 104. For example, step 704 may include programming GeoDNS of a cloud computing platform 102 to resolve a domain name to a static IP address for a given location of a user endpoint 112*a*-112*d* that results in bypass of POPs 106*a*-106*c* of the cloud computing platform 102.

If the lane for a user and/or application instance 200*a* is found 706 to be the fast lane, the intelligent routing module 402 may configure 708 the fabric such that ingress is performed at a cloud POP 106*a*-106*c* with use of the cloud backbone for intra-cloud traffic. This may include associating the name and/or domain of the application instance with an edge cluster 110*a* located within a cloud POP 106*a*-106*c*. The edge cluster 110*a* may be assigned an Anycast IP address in the cloud DNS 404. In this manner, traffic from user endpoints 112*a*-112*d* located nearer to a different regional cloud than that hosting the edge cluster 110*a* would be routed to a nearest POP 106*a*-106*c* and then over the cloud backbone 104 to the POP 106*a*-106*c* hosting the edge cluster 110*a*. User endpoints 112*a*-112*d* located nearer to the same regional cloud hosting the edge cluster 110*a* than other regional clouds of the cloud computing platform, may be routed over the Internet 108 to the POP 106*a*-106*c* hosting the edge cluster 110*a*.

If the lane for a user and/or application instance 200*a* is the performance lane, the intelligent routing module 402 may configure the fabric such that ingress is performed at a cloud POP 106*a*-106*c* without use of the cloud backbone for intra-cloud traffic. This may include associating the name and/or domain of the application instance with an edge cluster 110*a* located within a cloud POP 106*a*-106*c*. The edge cluster 110*a* may be assigned a static IP address (not Anycast) in the cloud DNS 404. The static IP address may be resolved from a domain name of a request according to the location of a user endpoint 112*a*-112*d* that generated the request. The resolution to the static IP address according to user endpoint 112*a*-112*d* location may be programmed into the GeoDNS of the cloud computing platform 102.

In this manner, traffic from user endpoints 112*a*-112*d* located nearer to a different regional cloud than that hosting the edge cluster 110*a* would be routed over the Internet 108 to the POP 106*a*-106*c* hosting the edge cluster 110*a* rather than over the cloud backbone 104. User endpoints 112*a*-112*d* located nearer to the same regional cloud hosting the edge cluster 110*a* than other regional clouds of the cloud computing platform, may be routed over the Internet 108 to the POP 106*a*-106*c* hosting the edge cluster 110*a*.

Note that in some instances, the benefit of one of the three lanes relative to another may be small. Accordingly, in some embodiments, a user preference may be overridden and substituted for a lower cost option when this occurs. For example, if a measured or estimated (see estimation techniques described below with respect to FIGS. 12 and 13) latency of a user endpoint 112*a*-112*e* with respect to an application instance 200 for one lane is within a threshold difference (e.g., a predefined number of milliseconds) of the latency for a second lane and the second lane has lower cost, the second lane may be substituted for routing traffic between the user endpoint 112*a*-112*e*.

Figure 8:
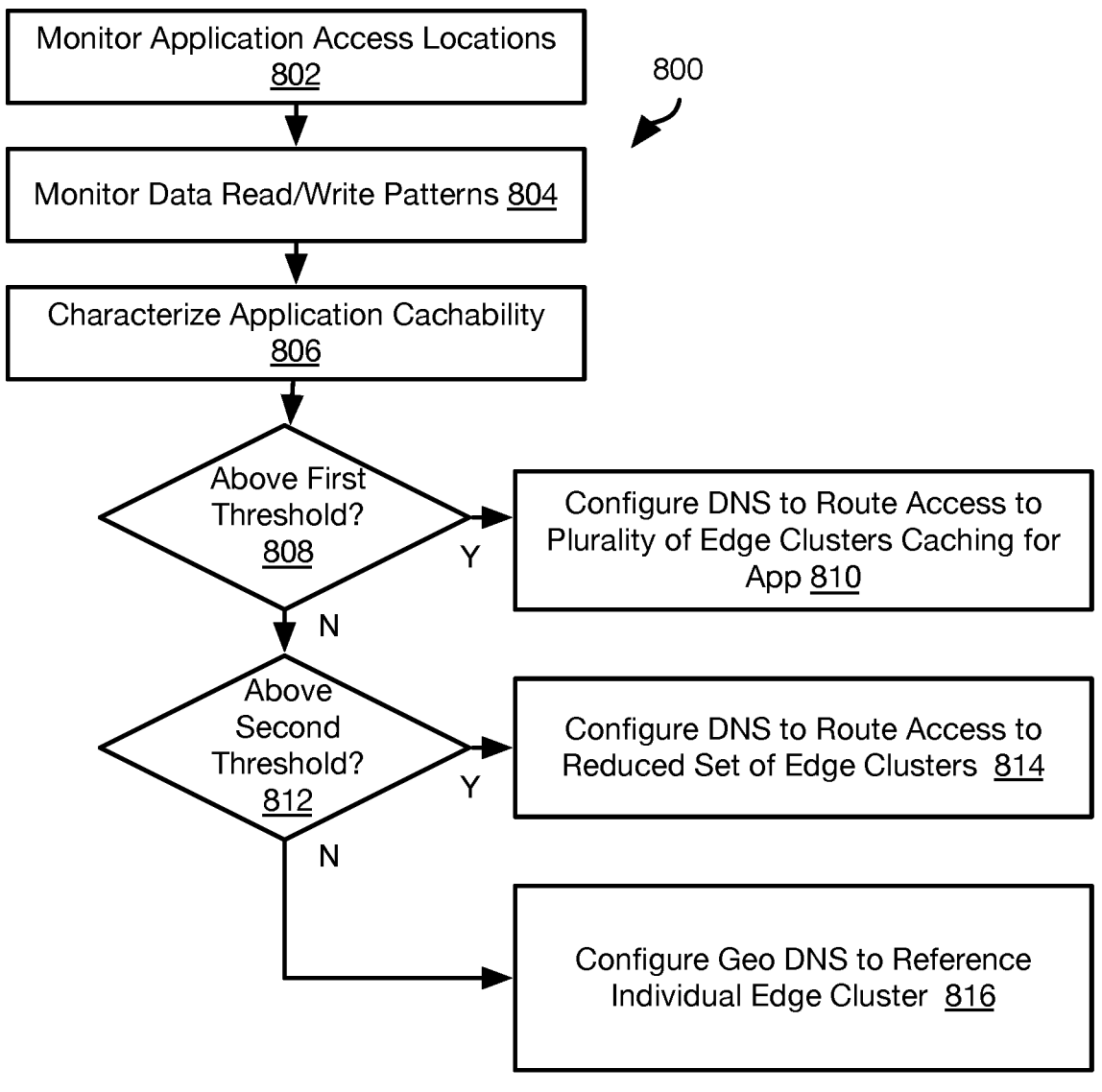
FIG. 8 is a process flow diagram of a method for implementing routing with respect to a cloud computing platform according to cacheability in accordance with an embodiment of the present invention.
Figure 9A:
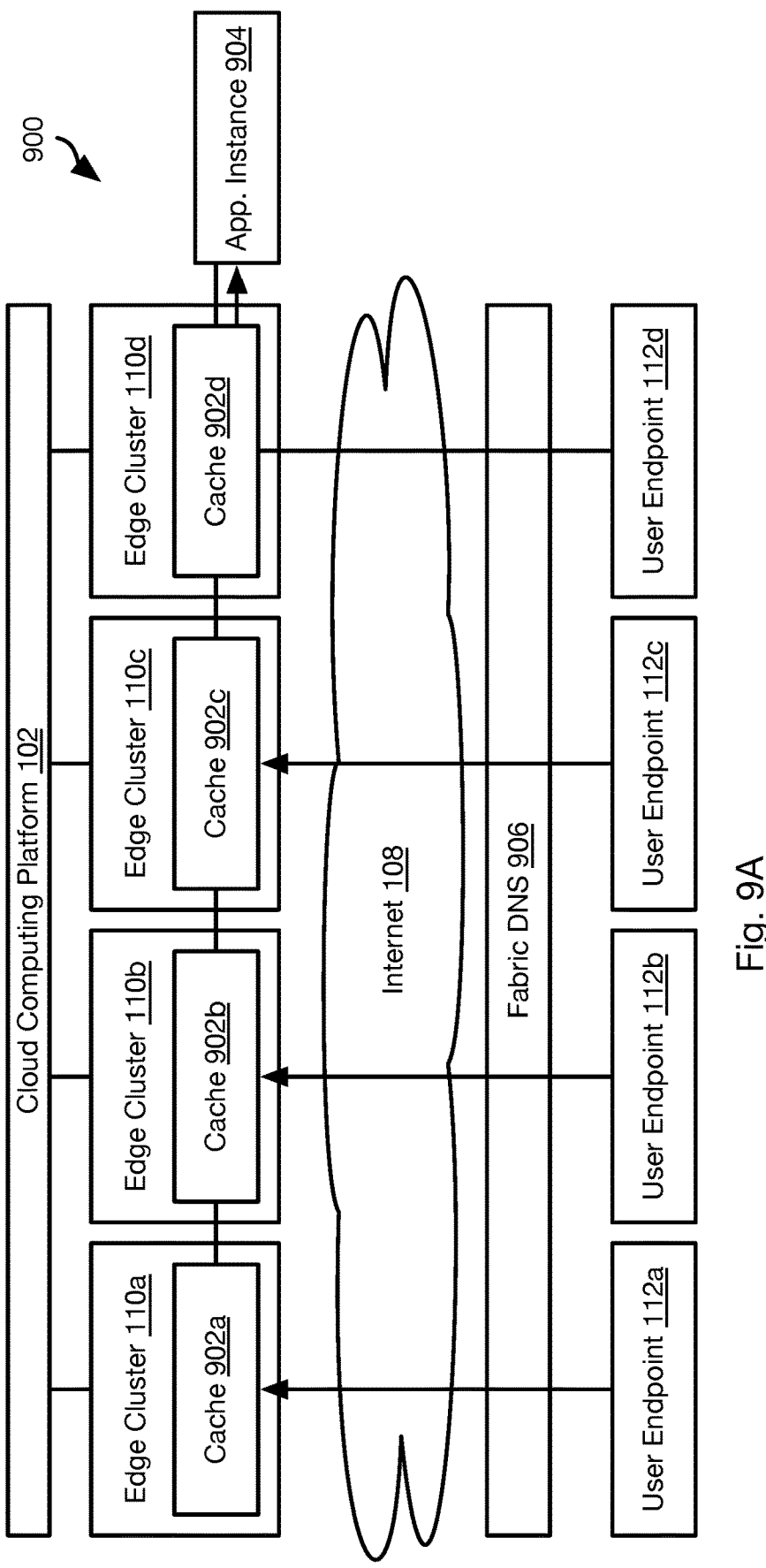
FIGS. 9A and 9B illustrate different routing configurations according to cacheability in accordance with an embodiment of the present invention.
Figure 9B:
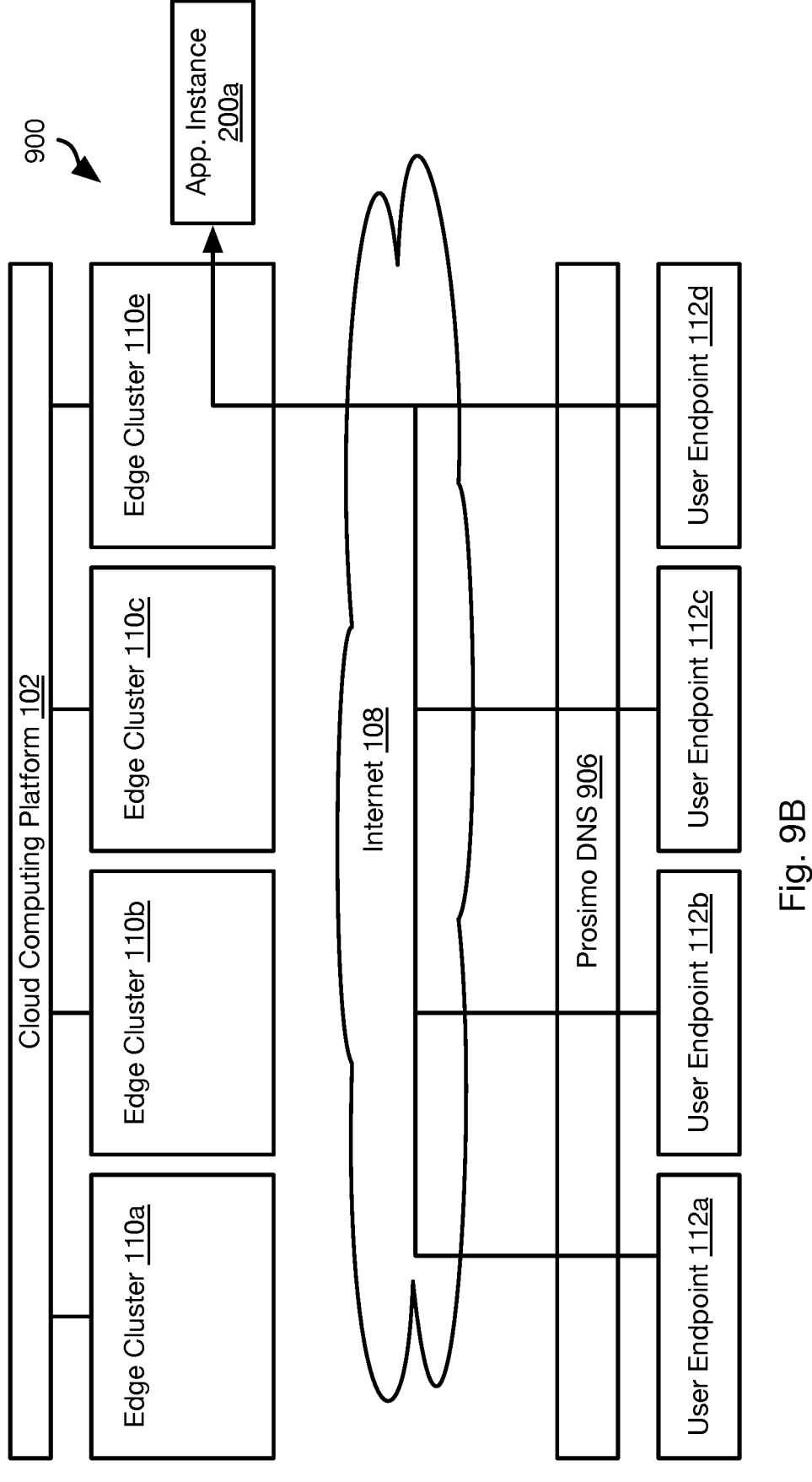

FIGS. 8, 9A, and 9B illustrate an approach for routing traffic for an application instance 200*a* to edge clusters 110*a*-110*e* of a fabric while taking into account cacheability of content provided by that application instance 200*a*.

For example, a method 800 may include monitoring 802 application access locations of user endpoints 112*a*-112*e* accessing the application instance 200*a*. The location of an endpoint 112*a*-112*d* at a time of generation of a request may be obtained by: inferring a location from a source IP address of the request, reading the location from a header included in the request, reading the location from an explicitly provided location value provided by the endpoint 112*a*-112*d* within the request. Monitoring 802 the locations may include some or all of compiling statistics for each location represented in received requests at varying degrees of specificity: requests from a country, from each state or province within the country, from each metropolitan area within the country, within each city within the country, etc. Statistics may be in the form of a frequency of requests (requests per day, hour, minute, or other time window) over time.

The method 800 may further include monitoring 804 data read and write patterns 804. This may include monitoring a cache for the application instance. Monitoring read and write patterns 804 may include monitoring a rate at which entries in a cache are overwritten or marked as invalid by the application 200*a*. Monitoring read and write patterns 804 may include inspecting requests and compiling statistics regarding the number of read requests and write requests, e.g. a number of write requests within a time window (e.g., every day, hour, minute, etc.) and a number of read requests within the time window sampled periodically over time. Step 804 may include calculating a ratio of these values over time, e.g., a ratio of reads per writes over time or within a time window preceding a time of calculation of the ratio.

The method 800 may include characterizing the cacheability of the application. This may include evaluating such factors as the ratio of reads per writes (a higher ratio of reads means higher cacheability) and labeling of data provided by the application in response to requests (e.g., whether the data is flagged as cacheable, a time to live (TTL) of the data). A cacheability score may be calculated as a function of these factors (a sum, weighted sum, etc.) and compared to one or more thresholds. For example, if the cacheability score is found 808 to be above a first threshold (highly cacheable), the intelligent routing module 402 may program the cloud DNS 404 and intelligent routing module to route access to the application 200*a* through a plurality of edge clusters 110*a*-110*e*. For example, the name and/or domain of the application 200*a* may be mapped to an Anycast IP address associated with the plurality of edge clusters 110*a*-110*e*. Accordingly, requests from each user endpoint 112*a*-112*d* will be routed to the edge cluster 110*a*-110*e* closest to it, which will have a high likelihood of having requested data to the cacheability of the application instance 200*a*.

In some embodiments, if the chacheability is found 812 to be below the first threshold but above a second threshold, step 814 is performed, which may be the same as step 810 but for a reduced number of edge clusters 110*a*-110*e*. For example, the set of edge clusters 110*a*-110*e* associated with the Anycast IP address may be limited to those closest to the application instance 200*a* relative to those edge clusters 110*a*-110*e* that are excluded. In some embodiments, a single threshold is used such that steps 812 and 814 are not performed.

If the cacheability is not found to meet a threshold condition (below the first threshold or below multiple thresholds), then the method 800 may include the intelligent routing module 402 configuring 816 the cloud DNS 404 and/or alternate routing logic 406 such that traffic from each user endpoint 112*a*-112*e* and addressed to the application instance 200*a* will be routed to a single edge cluster 110*a*, e.g. the edge cluster 110*a* closest to the application instance 200*a* or at least in the same regional cloud or the same POP 106*a*-106*c* as the application instance 200*a*. This routing may be according to any of the three lanes described above (cost effective, fast lane, performance) such that traffic may be routed through POPs 106*a*-106*c* and the cloud back bone 104 (fast lane), through a POP 106*a* closest to the edge cluster 110*a* but not the cloud backbone 104 (performance), or through an ingress location without using a POP 106*a* or the cloud backbone 104 (cost effective).

For example, to achieve the fast lane, the cloud DNS 402 may be configured such that edge cluster 200*a* is the only edge cluster associated with an Anycast IP address. Accordingly, all requests addressed to that IP address will be routed by the cloud DNS 402 through a POP 106*a*-106*c* closest to the source of the request and through the cloud backbone 104 to the edge cluster 110*a*.

FIG. 9A illustrates the case of a highly cacheable application instance 200*a* that is located close to edge cluster 110*d* (e.g., same POP 106*a*-106*c* or same regional cloud). A plurality of edge clusters 110*a*-110*d* may include caches 902*a*-902*d*. Data from responses to requests transmitted from the application instance 904 may be cached in the caches 902*a*-902*d*. The manner in which data is cached, cache hits are identified, and the caches 902*a*-902*d* are maintained may be according to any approach known in the art for implementing a cache, such as approaches for caching responses to HTTP content.

A fabric DNS 906 may be a combination of the cloud DNS 404, the intelligent routing module 402, and any alternate routing logic relating to access of the application instance 200*a* as described above. As is apparent the fabric DNS 906 in the highly cacheable case is configured to route requests to a plurality of edge clusters 110*a*-110*e*, such as to the edge cluster 110*a*-110*e* nearest to the endpoint 112*a*-112*d* that originated the request. Accordingly, if a response to the request is cached, that nearest edge cluster 110a-110e may provide the response without waiting for the application instance 200a.

FIG. 9B illustrates a non-cacheable case in which the fabric DNS 906 is configured to route requests directly to the edge cluster 110e, such as the edge cluster 110e nearest to the application instance 200a. FIG. 9B illustrates the case where traffic is routed to edge cluster 110e over the Internet 108, i.e., the cost effective lane. In other instances, the traffic could be routed over the cloud backbone 104 to implement the fast lane.

Figure 10:
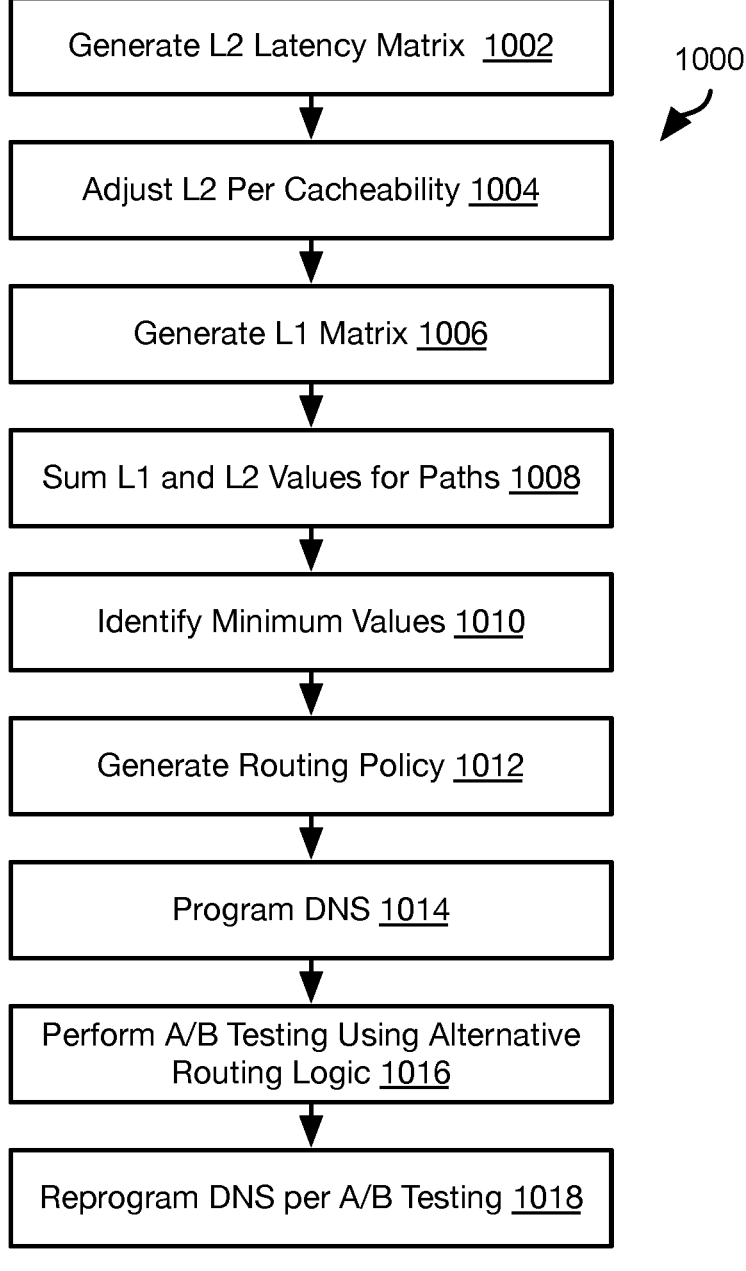
FIG. 10 is a process flow diagram of a method for selecting a routing policy according to latency in accordance with an embodiment of the present invention.

FIG. 10 illustrates another method 1000 that may be performed by the intelligent routing module 402 to program cloud DNS 404 to route traffic for an application instance 200a. The method 1000 may be used to program the DNS 404 and/or alternate routing logic 406 according to latency.

The method 1000 may include generating 1002 an L2 latency matrix. The L2 latency matrix may measure latency between one or more components of one or more cloud computing platforms. For example, this may include measuring the latency between regional clouds. An example latency matrix is shown in Table 1. As is apparent, each entry is a latency Aij indicating a latency between regional cloud Ri and regional cloud Rj. Latency Aij, i=j, may correspond to communication between components within the same regional cloud or such latency values may be ignored. L2 latency may be measured using cloud census agents provided by the cloud computing platform or by transmission speed tests performed by edge clusters 110a-110e communicating with one another from different regions. Other metrics may also be measured for each region Ri within a time window, such as number of queries received by application instance 200a from that region Ri, number of unique users of application instance 200a from that region Ri, and throughput of application instance 200a to that region Ri. In some implementations, the latency values for region Ri may be scaled by one or more of these metrics (scaled up with increase in number of queries, number of unique users, and throughput).

TABLE 1

| | L2 Latency Matrix | | |
| --- | --- | --- | --- |
| | R1 | R2 | R3 |
| R1 | A11 | A12 | A13 |
| R2 | A21 | A22 | A23 |
| R3 | A31 | A32 | A33 |

The method 1000 may include adjusting 1004 the L2 latency values according to cacheability. Where content of the application instance 200a is cached at an edge cluster 110a close to a user endpoint 112a, e.g., in the same geographic region assigned to a single regional cloud, requests do not need to traverse between regional clouds, even if the application instance 200a is in a different regional cloud than the edge cluster 110a. The cacheability, such as cacheability calculated as described above with respect to FIG. 8, may be a score in the form of a ratio from 0 to 1, i.e. a ratio of requests estimated to be serviceable from the cache for the application instance 200a.

For example, the latency may be multiplied by a boost factor F, such as La=L*F, where L is an original latency, La is the adjusted latency. F may be a function of cacheability and possibly one or more other values. For example, F may be calculated as Max(Min((1-F0-C), 1), 0.2). F0 may be an optimization value that may be selected for a given cloud computing platform 102. For example, a value of F0=0.1 is acceptable for some cloud computing platforms 102. C may be the cacheability of the application instance 200a. As is apparent from the equation above, F may be constrained to be a value between 0.2 and 1. Other minimum and maximum constraint values may also be used.

Note that in some embodiments, the location of application instance 200a is considered fixed for purposes of the method 1000. Accordingly, only a subset of L2 is considered, e.g., where application instance 200a is in region Rk only latencies Aik for regions Ri, i !=k, are considered.

The method 1000 may include generating an L1 matrix. The L1 matrix may be measured or estimated values of latency between user endpoints 112a-112e external to the cloud computing platform 102 and the edge clusters 110a-110e. An example L1 matrix is shown below in Table 2 in which each latency value Bij represents the latency between one or more user endpoints Ei and an edge cluster 110a-110e in a regional cloud Rj. The L1 latency Bij may be measured directly for traffic transmitted between the one or more endpoints Ei and an edge cluster 110a-110e in a regional cloud Rj. Bij may be an average, median, or other aggregation measured latencies for multiple endpoints Ei with respect to the edge cluster 110a-110e in a regional cloud Rj.

Measured L1 values may be cleaned prior to aggregation in order to remove anomalous values from the aggregation. For example, in some cases measurements may stand out from their neighbors. Cleaning may include identifying anomalous values using a voting mechanism such as k-nearest neighbors (KNN) or other clustering algorithm.

The measured L1 values aggregated may include values for users in different teams or different enterprises in order to improve the accuracy of the aggregated L1 values. L1 values may be measured for traffic routed to and from applications instances in addition to the application instance 200a either with or without constraint that the other application instances be of the same executable as the application instance 200a.

Where a measured L1 value, or an insufficient number of measured L1 values, are available with respect to a regional cloud Rj, it may be replaced with an average or median of other L1 values with respect to one or more other regional clouds R k, k!=j. An approach for estimating latency may also be used to fill a missing L1 value, such as the approach described below with respect to FIG. 13.

Other metrics may also be measured for the one or more user endpoints Ei within a time window, such as a number of queries received by application instance 200a from the one or more user endpoints Ei, number of unique users of application instance 200a from that one or more user endpoints Ei, and throughput of application instance 200a to the one or more user endpoints Ei. In some implementations, the L1 value for the one or more user endpoints Ei may be scaled by one or more of these metrics (scaled up with increase in number of queries, number of unique users, and throughput).

TABLE 2

| | L1 Latency Matrix | | |
| --- | --- | --- | --- |
| | R1 | R2 | R3 |
| E1 | B11 | B12 | B13 |
| E2 | B21 | B22 | B23 |
| E3 | B31 | B32 | B33 |

The method 1000 may include summing 1008 the L1 and L2 values (e.g., L1 and L2 values as adjusted per step 1004 and according to one or more metrics) for various paths between each user endpoint Ei to a region Rk hosting the application instance 200a. For example, Table 1 and Table 2 (such as after adjustment per step 1004 and per the one or more metrics) may be summed to obtain Table 3, below. Note that in some embodiments a filtering step is performed prior to generating Table 3 such that only lowest values of L2 latency are summed with corresponding L1 values, e.g., lowest or lowest N values, where N is a predetermined integer that is less than the number of L2 values.

TABLE 3

| | | L1 + L2 Latency Matrix | |
|---|---|---|---|
| | R1 | R2 | R3 |
| E1 | A11 + B11 | A12 + B12 | A13 + B13 |
| E2 | A21 + B21 | A22 + B22 | A23 + B23 |
| E3 | A31 + B31 | A32 + B32 | A33 + B33 |

The method 1000 may include identifying 1010 minimum values, for example, for each group of one or more endpoints Ei, a regional cloud Ri with the lowest combined latency in Table 3 may be identified. In some embodiments, multiple regional clouds may be selected that have the lowest latency in Table 3 relative to other regional clouds that are not selected.

The method 1000 may include generating 1012 a routing policy. For example, this may include a policy that user endpoints 112a-112e within a particular region associated with a regional cloud should access the application instance 200a through a particular ingress point in a particular regional cloud and possibly a particular edge cluster 110a-110e in that regional cloud, the regional cloud may be that selected as providing lowest latency at step 1010. The policy require routing of traffic to the application instance 200a to multiple ingress points in one or more regional clouds and possibly more than one edge cluster 110a-110e, the one or more regional clouds corresponding to the multiple regional clouds identified at step 1010.

The method 1000 may include programming 1014 one or both of the cloud DNS 404 and alternative routing logic 406 of the edge clusters 110a-110e in order to implement the routing policy. In particular, the approach described above with respect to FIGS. 4 and 5 provides the ability to route traffic for a particular application instance through an arbitrary edge cluster 110a-110e according to location of a user endpoint 112a-112d that generated the traffic. Accordingly, step 1014 may include using this functionality to route traffic to the application instance 200a to a particular edge cluster 110a-110e according to the routing policy of step 1012.

The method 1000 may further include discovering improved routing policies. For example, the method 1000 may include performing 1016 A/B testing using the alternative routing logic 406 of the edge clusters 110a-110e and reprogramming 1018 or both of the cloud DNS 404 and the alternative routing logic 406 to implement an improved routing policy discovered by performing A/B testing.

For example, candidate routes may be identified. Candidate routes may be identified according to Table 3. For example, routes (e.g., regional clouds) in Table 3 that have a latency within some threshold amount or percentage (e.g., within 15 percent) of the latency of the routes selected at step 1010 may be identified.

An edge cluster 110a may be selected to be the recipient of traffic routed to a particular application instance 200a at step 1012 from user endpoints in a particular region. An edge cluster 110b may be identified as part of a candidate route and be located in a regional cloud different from edge cluster 110a that was not selected according to step 1010. The alternative routing logic 406 of the edge cluster 110a may be programmed to redirect a percentage (e.g., 10 percent or less) of requests addressed to the application instance 200a from endpoints in the particular region to edge cluster 110b, i.e. instruct a user endpoint 112a to resend the request ("the redirected request") to the edge cluster 110b. The requests to be redirected may be selected randomly. The latency of the redirected requests from one or more user endpoints in the particular region may be measured, e.g. a latency from transmitting a redirected request from the user endpoint 112a to the application instance 200a. An aggregated latency, e.g. average, median, etc., of the redirected requests may be calculated. The latency of non-redirected requests to the application instance 200a from endpoints in the particular region that are routed by way of the edge cluster 110a may also be aggregated in the same manner. The aggregated latencies of the redirected and non-redirected requests may be compared. If the redirected latencies are lower, the method 1000 may include reprogramming one or both of the cloud DNS 404 and the alternative routing logic 406 such that requests to the application instance 200a from user endpoints in the particular region will be routed to the edge cluster 110b.

In some embodiments, A/B testing may test latency for different lanes. For example, if routing for an application instance 200a is configured to use the fast lane, A/B testing may be used to route some traffic over the corresponding performance lane. If measured latency between the fact lane traffic and the performance lane traffic is less than a predefined threshold, the dashboard 114 may output a recommendation to a user to downgrade to the performance lane in order to save money.

Figure 11:
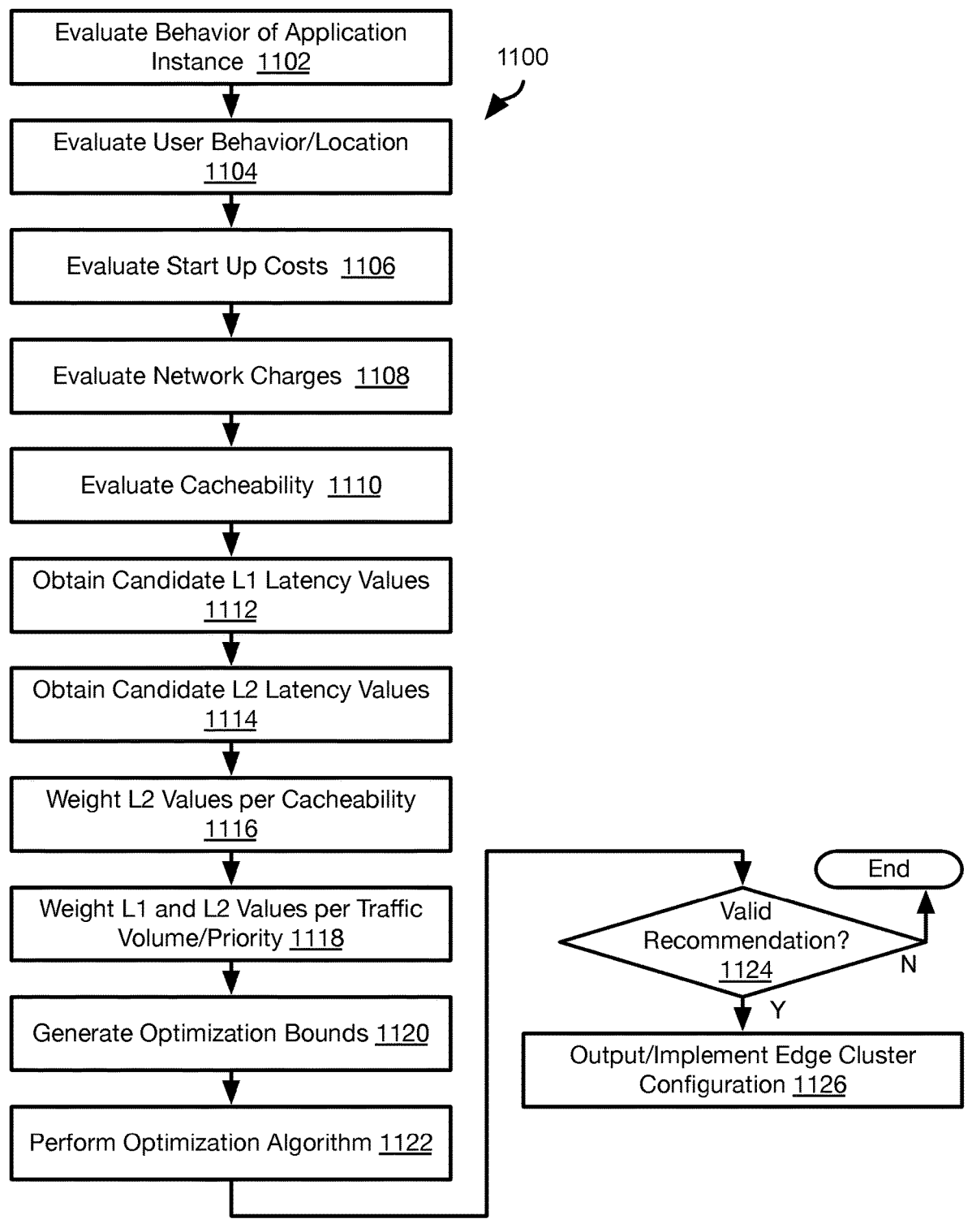
FIG. 11 is a process flow diagram of a method for determining a configuration of edge clusters for a cloud computing platform in accordance with an embodiment of the present invention.

FIG. 11 illustrates a method 1100 that may be used to improve the aggregate latency of a fabric of edge clusters 110a-110e with respect to an application instance 200a. The method 1100 may be executed by the intelligent routing module 402. The method 1100 may be used to identify where edge clusters 110a-110e should be instantiated or shut down. The method 1100 may be invoked in response to measured changes in latencies discussed below. For example, if a measured latency for a network path changes by more than a threshold amount, the method 110 may be executed in response.

The method 1100 may include evaluating 1102 behavior of the application instance 200. This may include such information as evaluating a time spent responding to requests. Other application behaviors may include sizes of requests, numbers of read requests received per time unit (minute, hour, day, etc.), numbers of write requests received per time unit, or other behaviors. For each behavior evaluated, step 1102 may include calculating statistics based on it such as average, median, standard deviation, 25 and 75 the percentile, or other values. The method 1100 is described above with respect to an individual application instance 200. In other embodiments, an aggregation of data from multiple application instances 200. Accordingly, requests may include sums of requests for the multiple application instances 200 or average requests per unit time for all of the multiple application instances 200.

The method 1100 may include evaluating 1104 user behavior and locations for each individual user of the application, groups of users, or an aggregation of users. User behaviors may, for example, include numbers of read requests sent per time unit (minute, hour, day, etc.), numbers of write requests sent per time unit, or other behaviors. For each behavior evaluated, step 1104 may include calculating statistics based on it such as average, median, standard deviation, 25 and 75 the percentile, or other values.

Step 1104 may include evaluating user locations. This may include aggregating requests based on region of origin for regions of one or more sizes up to and including an entire region associated with a regional cloud, e.g. requests per time unit from a given city, state/province, country, or other geographical division.

The method 1100 may include evaluating 1106 startup costs for one or both of instantiating a new edge cluster 110a-110e and shutting down an edge cluster 110a-110e. This may include recording storage usage and processing usage between when instantiation of an edge cluster 110a-110e begins and when the edge cluster 110a-110e becomes available to process requests. This information may be available from a provider of the cloud computing platform 102.

The method 1100 may include evaluating 1108 network charges. This information may be readily available from a provider of the cloud computing platform and may be as simple as a monetary cost per unit of data transferred or may specify monetary cost per unit of data transferred for different regions of the cloud computing platform (transmitted through POP 106a-106c, transmitted through non-POP ingress location, transmitted over non-backbone network, transmitted over backbone network 104).

The method 1110 may include evaluating cacheability of the application instance. Cacheability may be calculated using the same approach described above with respect to the method 1000 of FIG. 10.

The method 1100 may include obtaining 1112 L1 latency values, obtaining 1114 L2 latency values. The L1 and L2 values may be obtained as described above with respect to the method 1000 of FIG. 10. The L1 and L2 values obtained may be for a candidate regional cloud. For example, regional clouds that do not currently host an edge cluster 110a-110e and from which at least one user endpoint 112a-112e has generated a request to the application instance, or a minimum volume of requests per time unit, may be deemed a candidate for which L1 and L2 values may be obtained.

As described in greater detail below, the method 1100 may be used to identify edge clusters 110a-110e that should be shut down. Accordingly, L1 and L2 values may be obtained for regional clouds hosting these edge clusters 110a-110e. Candidates for being shut down may be identified based on request volumes processed by these edge clusters, e.g., M edge clusters 110a-110e processing the smallest numbers of requests per time unit for the application instance, where M is an integer, for example 1 or 2.

The method 1100 may include weighting 1116 L2 values according to cacheability and weighting 1118 L1 and L2 values according to values such as traffic volume, priority, or other values. As noted above, the impact of L2 latency is reduced when content is cached. Accordingly, step 1116 may include weighting L2 values according to the cacheability score of the application instance 200a as described above.

Weighting at step 1118 may be according to a function such that L1 and L2 latency:

increase with increase in a volume of traffic to and from the application instance 200a that experiences the L1 and L2 latency, i.e. traffic that is routed over the Internet 108 to the regional cloud for which the L1 latency is defined and traffic between regional clouds for which the L2 latency is defined.

increase with increase in priority of the user that generated the traffic experiencing the L1 and L2 latency, the data conveyed by the traffic, or other association between the traffic and the priority.

The method 1100 may include generating 1120 optimization bounds. For example, the number of edge clusters 110a-110e may be added may be limited to a particular number, e.g. a value between 5 and 7. The number of edge clusters that may be removed may likewise be limited, such as between 1 and 2. Other bounds may include a stopping condition for an optimization algorithm, such as a minimum change in improvement between at iterations at which the optimization algorithm will be stopped. Other bounds may be that any edge clusters added according to the optimization algorithm must not increase latency by more than a maximum amount relative to latency (L1 and/or L2 or a combination thereof) of existing edge clusters 110a-110e.

The method 1100 may include performing 1122 an optimization algorithm. The optimization algorithm seeks a configuration of edge clusters 110a-110e that provides reduced latency for users at endpoints 112a-112e generating traffic as indicated by user behavior. The optimization algorithm may evaluate a cost function for possible configurations that is a function of latency (L1 and L2) experienced by each user endpoint 112a-112e, start-up costs, and network charges. The optimization algorithm may be a genetic algorithm, machine learning algorithm, or other optimization algorithm. The optimization algorithm may consider only those configurations specified by the optimization bounds and may continue until the specified stopping condition is reached.

The method 1100 may include validating 1124 configurations of edge clusters selected according to the optimization algorithm. For example, some configurations may be deemed unacceptable and discarded. For example, if a latency reduction, e.g. 2 to 10 percent, for an edge cluster configuration is less than a minimum amount relative to the existing configuration of edge clusters 110a-110e, the cluster configuration may be discarded. In another example, cluster configurations that only improve latency for user endpoints 112a-112e fewer in number than a predefined minimum, the cluster configuration may be discarded.

Cluster configurations that are validated, i.e. not discarded, per step 1124 may be subject to further processing. This may include outputting 1126 a report to an administrator proposing placement of edge clusters 110a-110e in regional clouds according to one or more of the cluster configurations. Alternatively, step 1126 may include the dashboard 114 automatically implementing a cluster configuration that is validated according to step 1124, e.g. creating new edge clusters 110a-110e and/or removing one or more edge clusters 110a-110e to achieve the cluster configuration.

Figure 12:
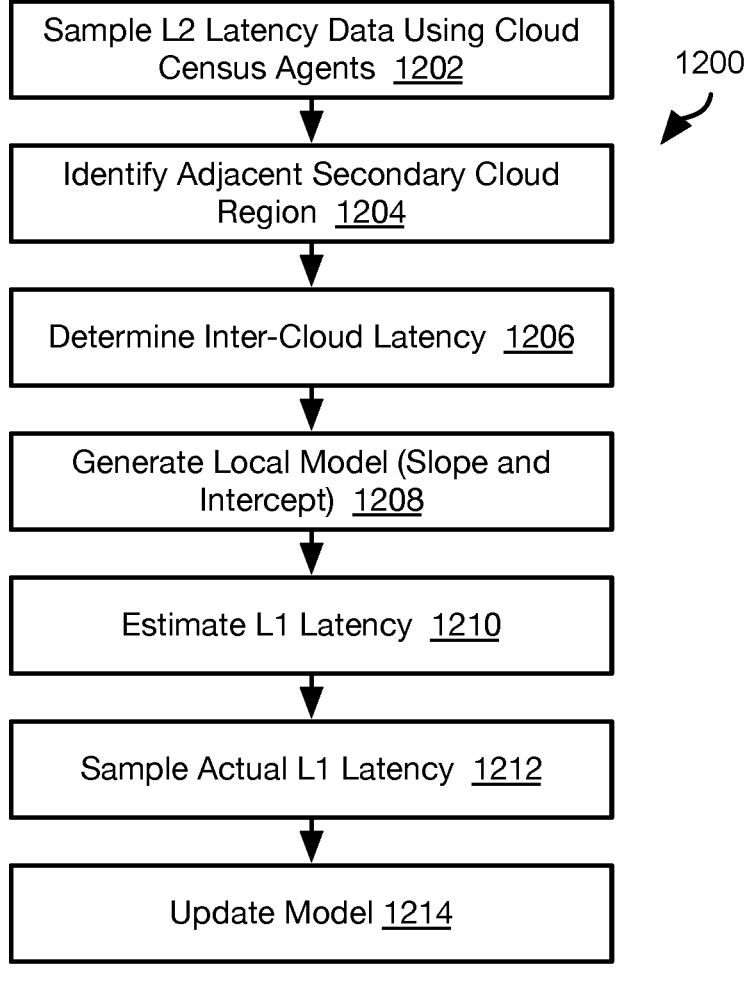
FIG. 12 is a process flow diagram of a method for estimating L1 latency in accordance with an embodiment of the present invention.

Referring to FIG. 12, in many instances, L1 data is not available or is not available in sufficient quantity to provide high confidence for a given geographic region. Likewise, for traffic routed over the Internet 108 for a given pair of regions, there may be insufficient traffic for that particular combination of regions to estimate latency between them. The illustrated method 1200 may be performed by the dashboard 114 in order to estimate L1 data. The estimated L1 data may be used in any of the algorithms described herein in place of measured L1 data.

The method 1200 may be understood with respect to a primary cloud computing platform 102 (hereinafter "primary cloud") with one or more regional clouds (hereinafter "primary region") and one or more secondary cloud computing platforms 102 with one or more regional clouds (hereinafter "secondary region"). The primary cloud may be the cloud hosting the application instance 200a and the edge clusters 110a-110e through which user endpoints 112a-112e access the application instance 200a. The secondary cloud may be used to obtain latency measurements relative to the primary cloud to estimate L1 latency as described below. For example, the primary cloud may be AWS whereas the secondary clouds include one or more of AZURE, GCP, or other cloud platform. The secondary cloud may be characterized as including a different cloud back bone and different computing devices and regional networks than the primary cloud.

For purpose of illustration, the method 1200 is described with respect to an endpoint 112a in the geographic region associated with a primary region R2 and a geographic region associated with a secondary region S2. The method 1200 describes estimation of L1 latency between the endpoint 112a and an edge cluster 110a in primary region R1 corresponding to a different geographic region than that associated with R2 and S2.

The method 1200 may include sampling 1202 L2 latency between primary regions and secondary regions. This may include measuring latency between the primary regions using cloud census agents executing in the primary regions and secondary regions.

The method 1200 may include identifying 1204 one or more secondary cloud regions closest to that end point (S2 in the illustrated example). For example, for a city including one or more user endpoints 112a-112e, such as Seattle, step 1204 may include identifying a secondary region in Seattle, e.g. to which traffic from Seattle user endpoints is routed. Step 1204 may be repeated for secondary regions of multiple secondary clouds.

The method 1200 may include determining 1206 inter-cloud latency and distance between the secondary regions identified at step 1204 and edge clusters 110a-110e in the primary cloud. The inter-cloud latency may be the L2 latency between the secondary regions and the primary regions. In the illustrated example, this may include the L2 latency between R1 and S2.

The method 1200 may include generating 1208 a local model of latency for user endpoints 112a-112e with respect to primary and/or secondary regions. In particular, the local model may characterize the infrastructure of the Internet 108 connecting the user endpoints 112a-112e to either of the primary and secondary regions. In the illustrated example, this may include a model of a latency with respect to distance for endpoints in the geographic region associated with primary region R2 and/or secondary region S2. In some embodiments, this may include a speed of light estimation, e.g., D*C+b, where D is distance, C is the speed of light and b is a baseline latency that may be determined experimentally. The value of C may also be obtained experimentally for packets transmitted between locations within a geographic region, such as the geographic region associated with primary region R2 and/or secondary region S2.

The method 1200 may include proceeding with estimating L1 latency using the data obtained from the foregoing steps. In the illustrated example, the L1 latency for user endpoint 112a at a given location with respect to primary region R1 may be calculated as L1=L2(R1, S2)+D*C+b, where L2(R1, S2) is the measured L2 latency between primary region R1 and secondary region S2, D is the estimated distance (straight line or cable length) between user endpoint 112a and secondary region S2, C is the speed of light or other experimentally determined speed and b is the baseline latency that is also determined experimentally.

The method 1200 may include continuing to sample 1212 latency values and updating 1214 one or more models used to estimate latency accordingly. For example, latency with respect to distance within the geographic region associated with secondary region S2 may be measured and the values of C and b may be calculated based on this data in order to provide more accurate estimates. Likewise, the L2 latency between primary region R1 and secondary region S2 may continue to be measured such that estimates are based on current data.

L1 measurements between endpoints, which may be in the geographic region associated with secondary region S2 with respect to primary region R1 may also be measured over time. A dedicated model of latency may be calculated that is specific to endpoints in a particular geographic region within which L1 measurements have been taken, e.g., L1=C*D+b, where D is the distance between a user endpoint and R1 and C and b are calculated to fit the value of L1 to the measured L1 values for the particular geographic region.

The methods 1100 and the method 1200 both rely on measurements of L1 and/or L2. The methods 1100 and 1200 may be performed periodically. In some embodiments L1 and L2 values may be measured periodically. If one or more L1 and L2 values change relative to those used in a previous iteration of the method 1100 or 1200, the dashboard 114 may invoke another iteration of the method 1100 or 1200.

Figure 13:
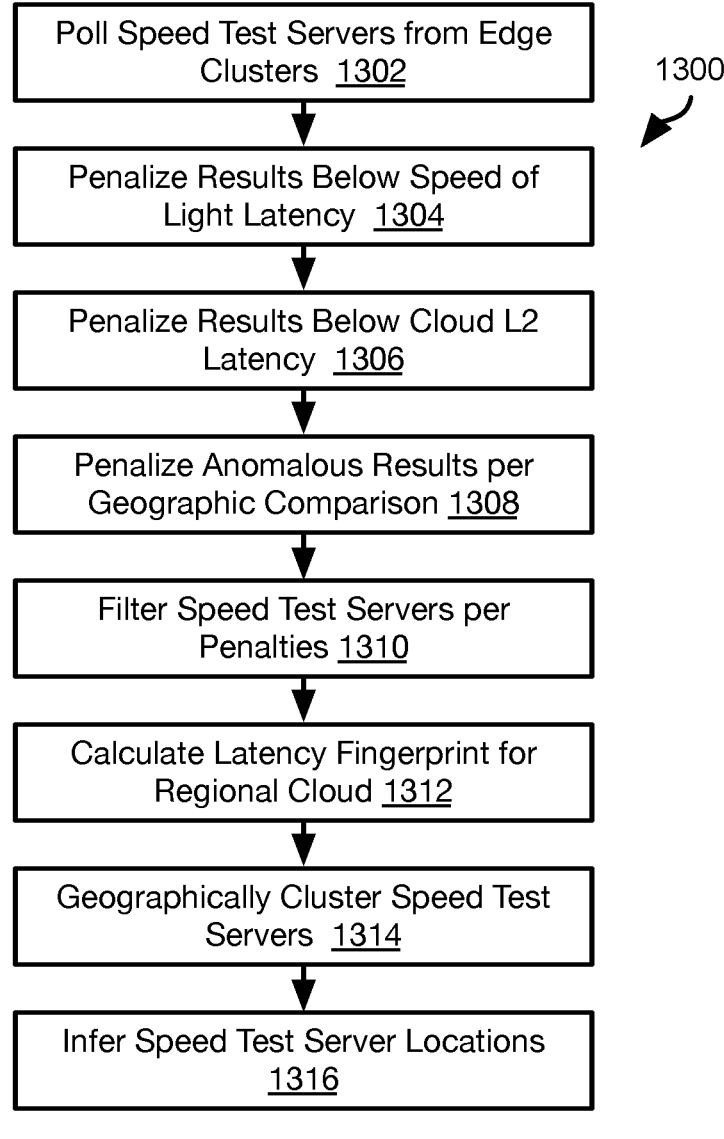
FIG. 13 is a process flow diagram of a method for evaluating speed test servers in accordance with an embodiment of the present invention.

Referring to FIG. 13, latency at various geographic regions in the Internet 108 may be measured using speed test servers. A speed test server may be embodied as agent software running on a user endpoint 112a-112d and may initiate the latency measurement to geographically distributed locations. The speed of the Internet 108 within different geographic regions may be used to estimate L1 latency as described above (e.g., estimate C and b values) The method 1300 may be executed by the dashboard 14 in order to validate speed test servers and estimate actual locations of traffic attributed to a speed test server (e.g., detect locations of proxies).

The method 1300 may include polling 1302 speed test servers from edge clusters 110a-110e to obtain speed test measurements (e.g., latency measurements). Each speed test server may have an announced location or an inferred location (such as from an IP address of the speed test server).

For each measurement from each speed test server, the method 1300 may include assigning penalties to the measurements where appropriate. For example, for a measurement between a speed test server and an edge cluster 110a having a known location, the measurement may be compared to the latency of light traversing the straight line distance from the location of the speed test server to the location of the edge cluster 110a. The measured latency between the speed server and the edge cluster 110a is less than the latency of light, then a penalty may be assigned 1304 to the speed test server. The amount of the penalty may increase with an amount by which the measured latency is less than the latency of light, e.g. be a multiple of that amount.

The method 1300 may include assigning 1306 a penalty to speed test servers with measured latencies that are less than a corresponding intracloud L2 latency. For example, suppose a speed test server has an announced location in a geographic region associated with a regional cloud R1. If a measured latency between the speed test server and an edge cluster 110b in regional cloud R2 is less than the L2 latency between regional clouds R1 and R2, the speed test server may be assigned 1306 a penalty. The amount of the penalty may increase with an amount by which the measured latency is less than the L2 latency, e.g. be a multiple of that amount.

The method 1300 may further include assigning 1308 a penalty to speed test servers with measured latencies that are anomalous with respect to neighboring speed test servers. For example, suppose there is a plurality of speed test servers in the geographic region associated with regional cloud R1 and that latencies for the speed test servers to an edge cluster 110b in regional cloud R2 are measured. If the measured latency of one of the speed test servers is anomalous relative to the other speed test servers, a penalty may be assigned to that speed test server. A measurement may be deemed anomalous if it is more than a threshold amount above or below an average of the measured latencies. A measurement may be deemed anomalous if it is more than X standard deviations above or below the average of the measured latencies, where X is a predefined value and the standard deviation is of the measured latencies for the plurality of speed test servers. The amount of the penalty may increase with an amount by which the measured latency is anomalous, e.g. a multiple of the absolute value of the difference between the measured latency and the average latency.

The method 1300 may include filtering 1310 speed test servers according to penalties assigned according to steps 1304, 1306, and 1308. For example, the penalties may be summed (either with or without weighting) and compared to a threshold. If the sum of the penalties for a speed test server exceed a threshold, a speed test server may be flagged as suspect and it and latencies measured using it may be ignored when measuring and estimating latency according to the methods described herein.

The method 1300 may include calculating 1312 a latency fingerprint for one or more regional clouds. For example, suppose there is a regional cloud R1 with a plurality of speed test servers in the geographic region associated with the regional cloud R1. Suppose there are one or more other cloud regions R2 to RN, N being an integer greater than 2. Each speed test server may measure latency with respect to edge clusters 110a-110e in the other cloud regions R2 to Rn. This set of measured latencies for a speed test server may be considered to be a fingerprint for that speed test server.

If each speed test server was located in the same geographic region, it should be expected that their fingerprints would be similar. The method 1300 may therefore include clustering speed test servers according to their fingerprints. This may be performed using any clustering algorithm known in the art. For example, the set of measured latencies may be considered as a vector, each element position in the vector corresponding to latency with respect to a particular regional cloud. The vectors for the plurality of speed test servers may be clustered according to k-means clustering (k may correspond to the number of regional clouds), or other clustering algorithm.

For example, suppose speed test server S1 has an announced location in the geographic region G1 corresponding to regional cloud R1. Suppose that the vector for S1 is clustered with the vectors for speed test servers located in a geographic region G2 corresponding to a different regional cloud R2 rather than the vectors for speed test servers located in G1. It may therefore be inferred 1316 that speed test server is actually located in region G2. The speed test server S1 may therefore be assumed to be in region G2 and measured L1 latencies may be used to characterize Internet latencies in G2 rather than G1.

24

Figure 14:
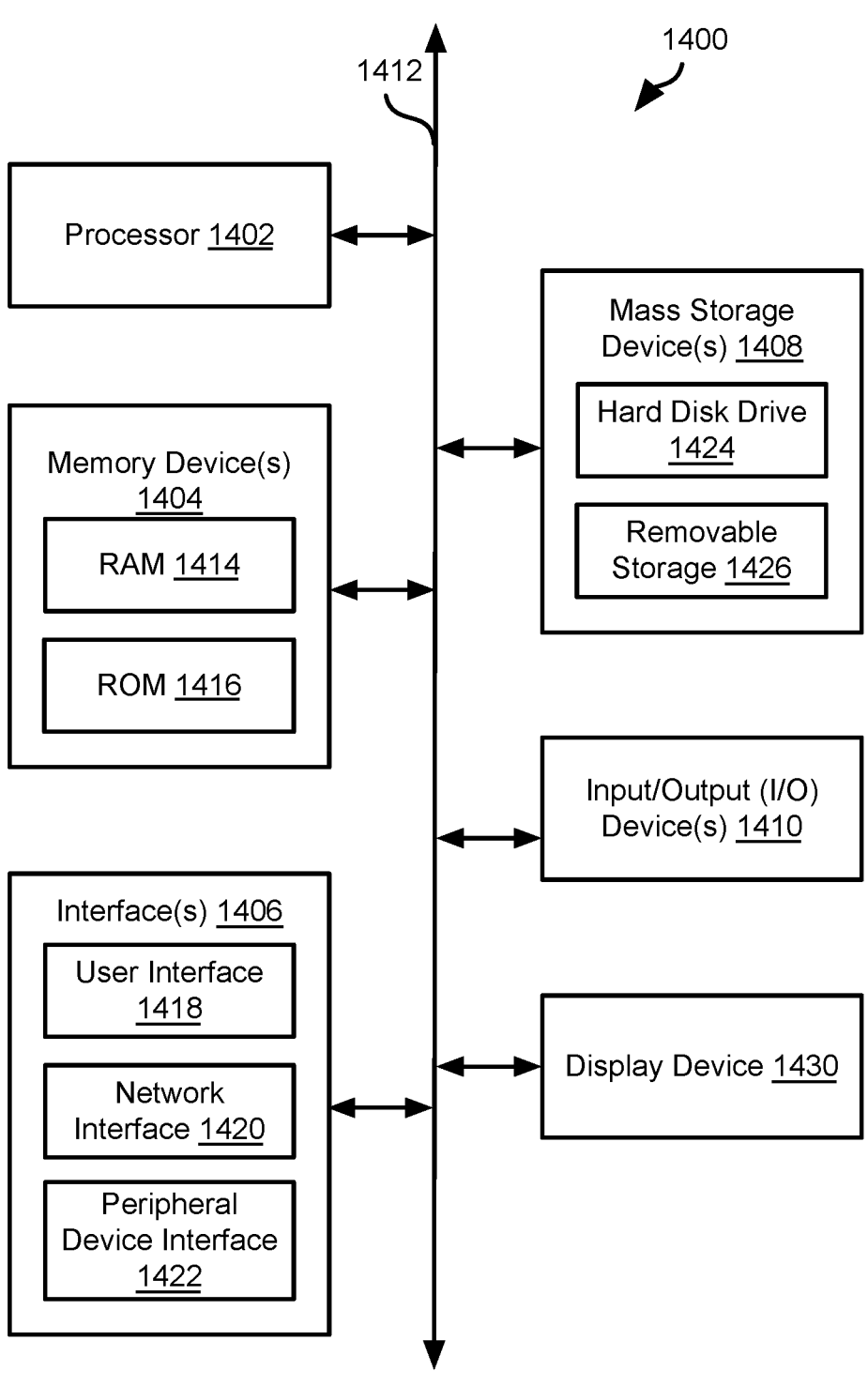
FIG. 14 is a schematic block diagram of a computing device that may be used to implement the systems and methods described herein.

FIG. 14 illustrates an example computing device 1400 that may be used to implement a cloud computing platform or any other computing devices described above. In particular, components described above as being a computer or a computing device may have some or all of the attributes of the computing device 1400 of FIG. 14. FIG. 14 is a block diagram illustrating an example computing device 1400 which can be used to implement the systems and methods disclosed herein Computing device 1400 includes one or more processor(s) 1402, one or more memory device(s) 1404, one or more interface(s) 1406, one or more mass storage device(s) 1408, one or more Input/Output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:

providing an application instance executing on a cloud computing platform including a plurality of regional clouds each associated with a geographic region and connected to one another by a cloud backbone network and by a wide area network WAN that is external to the cloud computing platform and does not include the cloud backbone network, the application instance executing in either a first regional cloud of the plurality of regional clouds or a computing device connected to the first regional cloud;

providing a first plurality of edge clusters having a first configuration including a first number of the first plurality of edge clusters and first locations of the first plurality of edge clusters in the plurality of regional clouds;

processing, by the first plurality of edge clusters, requests to access the application instance from a plurality of user endpoints in the WAN;

obtaining, by a computer module, a plurality of L1 values corresponding to latency between the plurality of user endpoints and the plurality of regional clouds;

obtaining, by the computer module, a plurality of L2 values corresponding to latency between pairs of regional clouds of the plurality of regional clouds; and selecting, by the computer module, a second configuration of a second plurality of edge clusters according to the plurality of L1 values, the plurality of L2 values, and quantities of the requests received from across the geographic regions associated with the plurality of regional clouds, the second configuration including a second number of the second plurality of edge clusters and second locations of the first plurality of edge clusters, wherein one or both of (a) the second number is different from the first number and (b) the second locations are not all identical to the first locations;

wherein selecting the second configuration comprises executing an optimization algorithm with respect to the plurality of L1 values, the plurality of L2 values, and the quantities of the requests received from the geographic regions associated with the plurality of regional clouds;

wherein executing the optimization algorithm comprises executing the optimization algorithm subject to bounds to obtain the second configuration; and wherein the bounds include at least one of a maximum increase of the second number relative to the first number and a maximum decrease of the second number relative to the first number.

2. The method of claim 1, further comprising outputting, by the computer module, a recommendation to implement the second configuration.

3. The method of claim 1, further comprising executing the optimization algorithm by evaluating each configuration of a plurality of configurations according to a cost function that is a function of the plurality of L1 values, the plurality of L2 values, the quantities of the requests received from the geographic regions associated with the plurality of regional clouds, and monetary costs for network usage and computational usage associated with each configuration.

4. The method of claim 1, wherein the bounds include a maximum permitted increase in latency experienced by the plurality of user endpoints relative to the first configuration.

5. The method of claim 1, further comprising characterizing cacheability of responses provided by the application instance in response to the requests and scaling down the plurality of L2 values according to the cacheability such that an amount of scaling down increases with increase in the cacheability.

6. The method of claim 1, further comprising scaling each L1 value according to one or both of a quantity of the requests received and sizes of the requests received from a geographic region corresponding to each L1 value.

7. The method of claim 1, further comprising:

evaluating the second configuration according to one or more validation criteria; and determining that the second configuration satisfies the one or more validation criteria; and in response to determining that the second configuration satisfies the one or more validation criteria, one or both of (a) outputting a report of the second configuration and (b) implementing the second configuration.

8. The method of claim 7, wherein the one or more validation criteria are a minimum improvement in overall latency of the second configuration relative to the first configuration.

9. A system comprising:

a cloud computing platform comprising a plurality of regional clouds connected by a cloud backbone network, each regional cloud comprising a plurality of computing devices associated with a geographic region and connected by a regional network, the plurality of regional clouds being further connected to a wide area network (WAN) that does not include the cloud backbone network, an application instance executing in a first regional cloud of the plurality of regional clouds;

a first plurality of edge clusters having a first configuration including a first number of the first plurality of edge clusters and first locations of the first plurality of edge clusters in the plurality of regional clouds, the first plurality of edge clusters being configured to process requests to access the application instance from a plurality of user endpoints in the WAN; and a computer module programmed to:

obtain a plurality of L1 values corresponding to latency between the plurality of user endpoints and the plurality of regional clouds;

obtain a plurality of L2 values corresponding to latency between pairs of regional clouds of the plurality of regional clouds; and select a second configuration of a second plurality of edge clusters according to the plurality of L1 values, the plurality of L2 values, and quantities of the requests received from the geographic regions associated with the plurality of regional clouds, the second configuration including a second number of the second plurality of edge clusters and second locations of the first plurality of edge clusters, wherein one or both of (a) the second number is different from the first number and (b) the second locations are not all identical to the first locations;

wherein the computer module is further programmed to select the second configuration by executing an optimization algorithm with respect to the plurality of L1 values, the plurality of L2 values, and the quantities of the requests received from the geographic regions associated with the plurality of regional clouds; and wherein the computer module is further programmed to execute the optimization algorithm by executing the optimization algorithm subject to a maximum increase of the second number relative to the first number and a maximum decrease of the second number relative to the first number.

10. The system of claim 9, wherein the computer module is further programmed to execute the optimization algorithm by evaluating each configuration of a plurality of configurations according to a cost function that is a function of the plurality of L1 values, the plurality of L2 values, the quantities of the requests received from the geographic regions associated with the plurality of regional clouds, and monetary costs for network usage and computational usage associated with each configuration.

11. The system of claim 9, wherein the computer module is further programmed to execute the optimization algorithm by executing the optimization algorithm subject to a maximum permitted increase in latency experienced by the plurality of user endpoints relative to the first configuration.

12. The system of claim 9, wherein the computer module is further programmed to characterize cacheability of responses provided by the application instance in response to the requests and scale down the plurality of L2 values according to the cacheability such that an amount of scaling down increases with increase in the cacheability.

13. The system of claim 9, wherein the computer module is further programmed to scale each L1 value according to a quantity of the requests received from a geographic region corresponding to each L1 value.

14. The system of claim 9, wherein the computer module is further programmed to:

evaluate the second configuration according to one or more validation criteria; and if the second configuration satisfies the one or more validation criteria, one or both of (a) output a report of the second configuration and (b) implement the second configuration;

wherein the one or more validation criteria are a minimum improvement in overall latency of the second configuration relative to the first configuration.

* * * * *